United States Patent [19]

Matsunawa et al.

[11] Patent Number: 4,980,758
[45] Date of Patent: Dec. 25, 1990

[54] IMAGE PROCESSING TECHNIQUE FOR PROCESSING DIGITAL COLOR IMAGE INFORMATION

[75] Inventors: Masahiko Matsunawa; Hiroyuki Yamamoto; Hiroshi Niki, all of Hachioji, Japan

[73] Assignee: Konica Corporation, Tokyo, Japan

[21] Appl. No.: 256,917

[22] Filed: Oct. 12, 1988

Related U.S. Application Data

[63] Continuation-in-part of Ser. No. 67,235, Jun. 25, 1987, abandoned.

[30] Foreign Application Priority Data

| Jun. 30, 1986 | [JP] | Japan | 61-154666 |
| Jun. 30, 1986 | [JP] | Japan | 61-154667 |
| Jun. 30, 1986 | [JP] | Japan | 61-154668 |
| Jun. 30, 1986 | [JP] | Japan | 61-154669 |
| Jun. 30, 1986 | [JP] | Japan | 61-154670 |
| Jun. 30, 1986 | [JP] | Japan | 61-154671 |
| Jun. 30, 1986 | [JP] | Japan | 61-154672 |

[51] Int. Cl.$^5$ .............................. H04N 1/46
[52] U.S. Cl. .............................. 358/75; 358/80
[58] Field of Search .......... 358/75, 75 IJ, 78, 79, 358/80

[56] References Cited

U.S. PATENT DOCUMENTS

| 2,598,504 | 5/1952 | Carlson | 358/75 |
| 4,261,011 | 4/1981 | Knop | 358/75 |
| 4,415,925 | 11/1983 | Tamura | 358/75 |
| 4,510,524 | 4/1985 | Kurata | 358/75 |
| 4,535,413 | 8/1985 | Shiota et al. | 358/80 |
| 4,546,381 | 10/1985 | Kurata et al. | 358/75 |
| 4,553,172 | 11/1985 | Yamada et al. | 358/75 |
| 4,591,905 | 5/1986 | Noguchi | 358/75 |
| 4,623,917 | 11/1986 | Noguchi | 358/80 |
| 4,689,666 | 8/1987 | Hatanaka | 358/75 |
| 4,841,361 | 6/1989 | Matsunawa et al. | 358/80 |

FOREIGN PATENT DOCUMENTS

| 0270087 | 6/1988 | European Pat. Off. |
| 0270090 | 6/1988 | European Pat. Off. |
| 51-116701 | 10/1976 | Japan |
| 58-142675 | 8/1983 | Japan | 358/75 |
| 58-150371 | 9/1983 | Japan | 358/80 |
| 59-128872 | 7/1984 | Japan |
| 59-163980 | 9/1984 | Japan |
| 60-63197 | 4/1985 | Japan | 358/75 |
| 60-148280 | 8/1985 | Japan | 358/75 |
| 60-180378 | 9/1985 | Japan | 358/75 |

OTHER PUBLICATIONS

Patent Abstracts of Japan, vol. 9, No. 382, (E–369), 24th Dec. 1985; and JP-A-60 160 774 (Fuji Xerox K.K.) 22-08-1985.
Patent Abstracts of Japan, vol. 6, No. 52 (E-100) [930], 7th Apr. 1982; and JP-A-56 166 666 (Ricoh K.K.) 21-1-2-1981.

*Primary Examiner*—James J. Groody
*Assistant Examiner*—Mark R. Powell
*Attorney, Agent, or Firm*—Frishauf, Holtz, Goodman & Woodward

[57] ABSTRACT

An image processing apparatus in which first color image signals of an original are separated into a plurality of color images and the optical information of the color image is converted to an electrical signal for each pixel of the image. The first color image signal is processed to generate a second color image signal which corresponds to each of the pixels, has a plurality of bits and carries density data and color data, the color data designating which one of a plurality of predetermined colors the color of the pixel belongs to, and image processing device for processing the second color image signal.

45 Claims, 30 Drawing Sheets

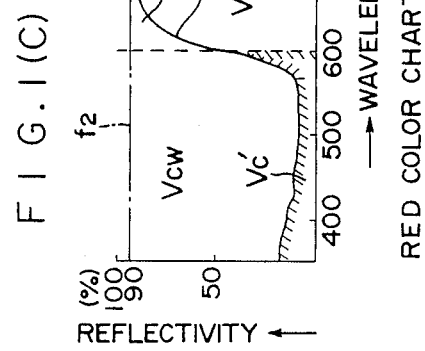
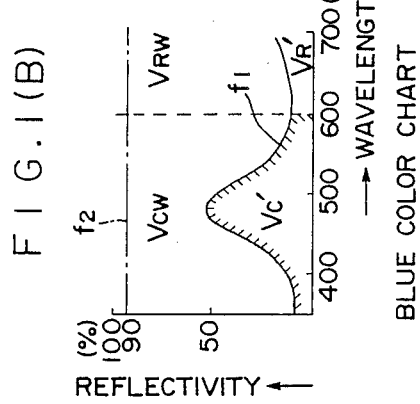
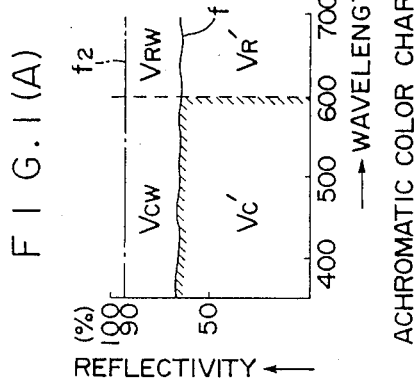
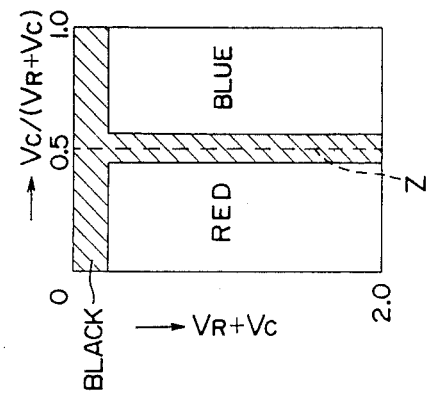
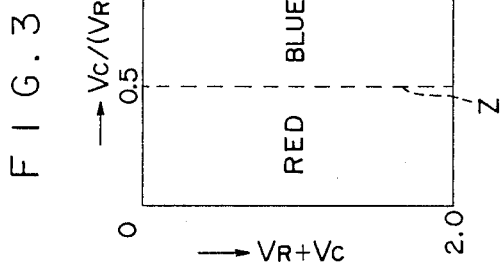
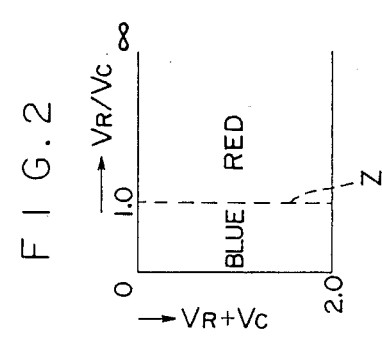

| BLACK | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| BLUE | 0 | 1 | 2 | 3 | 4 | 5 | 6 | 7 8 | | A | B | C | D | E | F | |
| RED | 0 | 1 2 3 | 4 | 5 | 6 | 7 | 8 | 9 A | | B | C | D | E | | F | |
| DENSITY | 0 | 0.1 | 0.2 | 0.3 | 0.4 | 0.5 | 0.6 | 0.7 | 0.8 | 0.9 | 1.0 | 1.1 | 1.2 | | | |

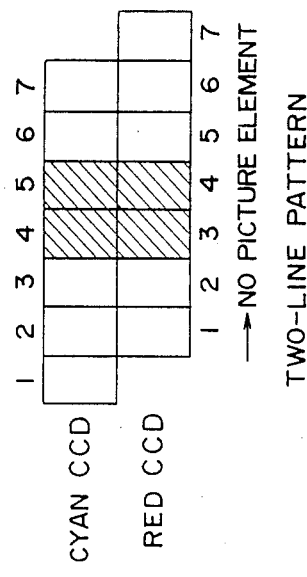
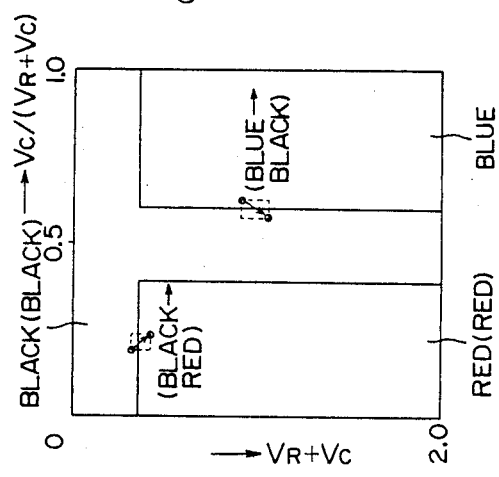
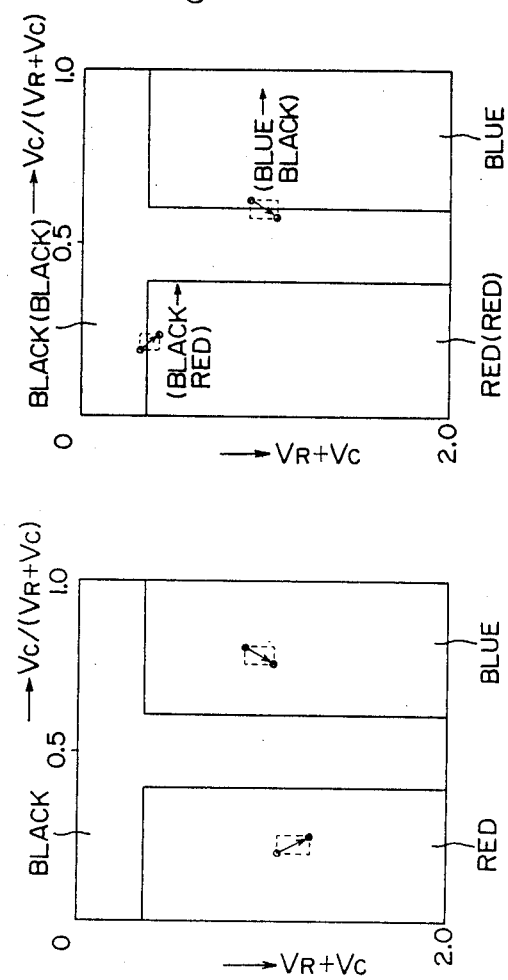

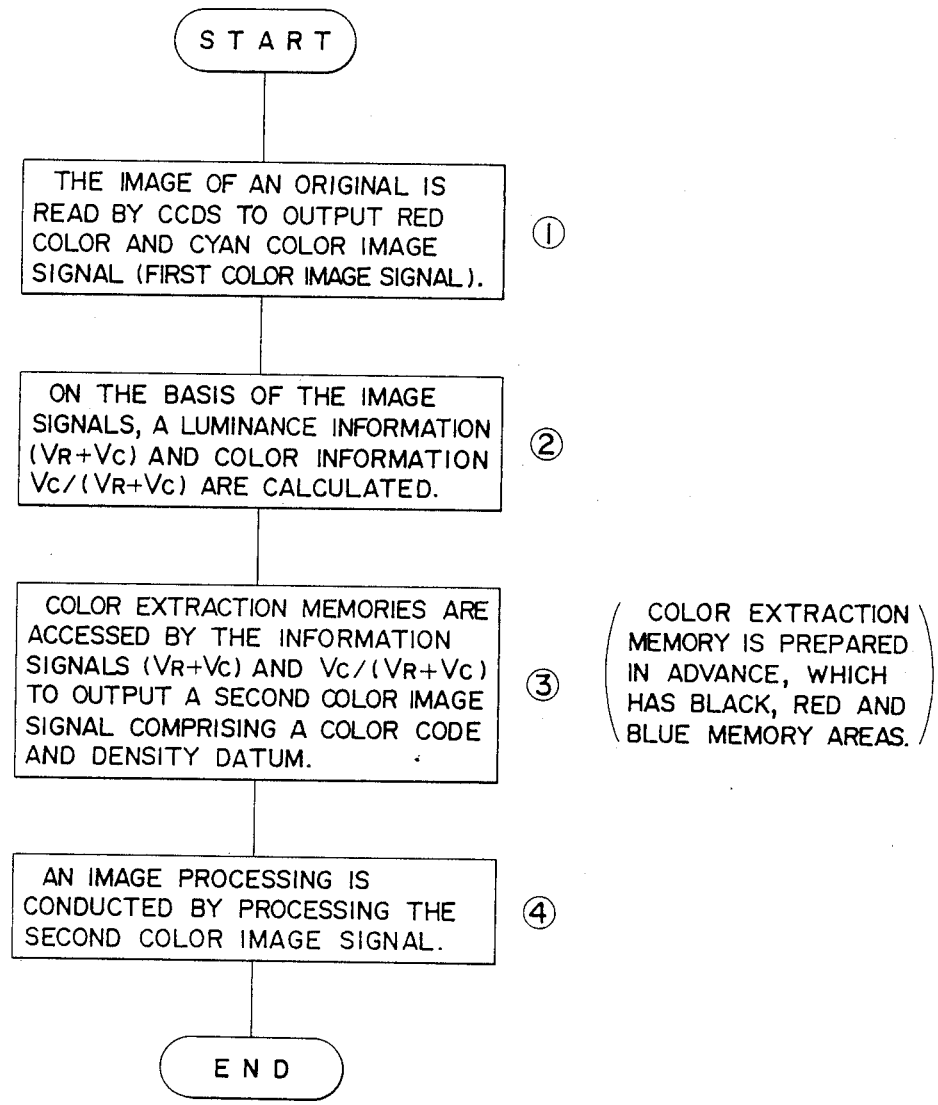

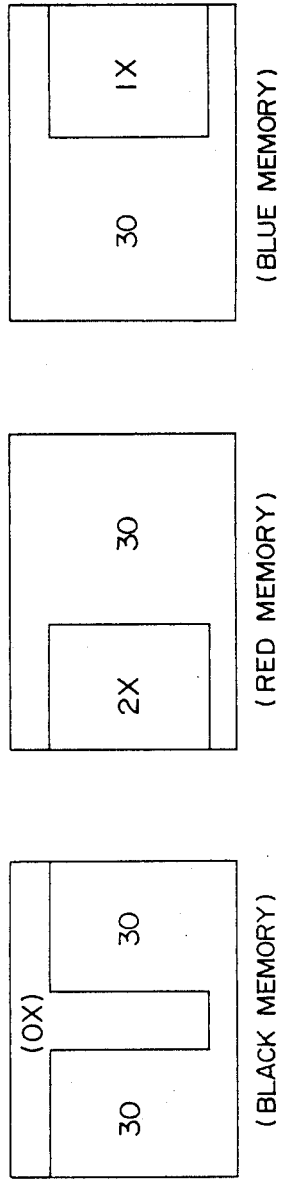
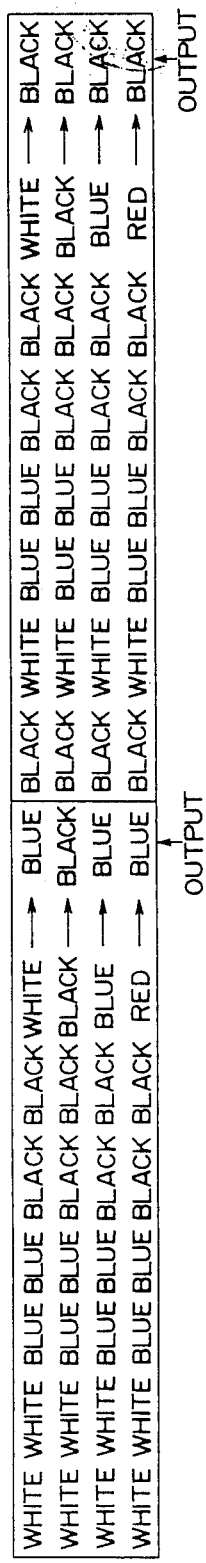

| N | M | COLOR PATTERN NUMBER | PATTERN SIZE |
|---|---|---|---|
| 2 (WHITE BLACK) | 3 | 8 | 1 X 3 |
|  | 5 | 32 | 1 X 5 |
|  | 7 | 128 | 1 X 7 |
| 3 (WHITE BLACK RED) | 3 | 27 | 1 X 3 |
|  | 5 | 243 | 1 X 5 |
|  | 7 | 2187 | 1 X 7 |
| 4 (WHITE BLACK RED BLUE) | 3 | 64 | 1 X 3 |
|  | 5 | 1024 | 1 X 5 |
|  | 7 | 16384 | 1 X 7 |
|  | 9 | 262144 | 3 X 3, 1 X 9 |

FIG. 22
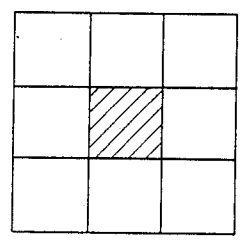
3×3
FIG. 23
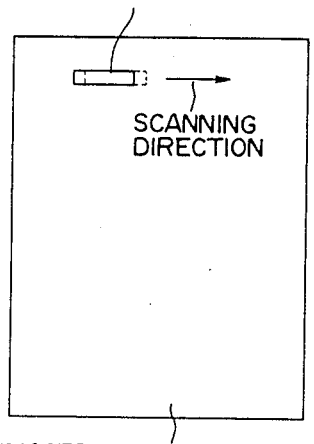
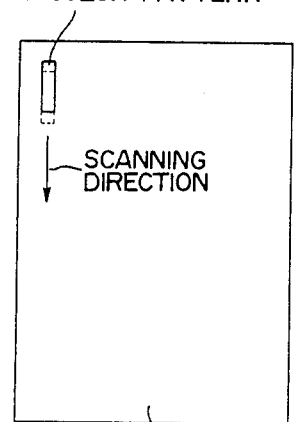

F I G. 25

BLACK $\begin{pmatrix} 2, 2 \\ 2, 2 \end{pmatrix}$   RED $\begin{pmatrix} 3, 5 \\ 6, 4 \end{pmatrix}$   BLUE $\begin{pmatrix} 7, 9 \\ 10, 8 \end{pmatrix}$

F I G. 26

| COLOR CODES | CLK | THRESHOLD VALUES |
|---|---|---|
| 0 0 | 0 | 2 |
|  | 1 | 2 |
|  | 2 | 2 |
|  | 3 | 2 |
| 0 1 | 0 | 7 |
|  | 1 | 9 |
|  | 2 | 10 |
|  | 3 | 8 |
| 1 0 | 0 | 3 |
|  | 1 | 5 |
|  | 2 | 6 |
|  | 3 | 4 |

F I G. 27(A)

|  |  | B B R | | |
|---|---|---|---|---|
|  |  | 0 0 | 0 1 | 1 0 |
| COLOR CODES | 0 0 | 1 | 0 | 0 |
|  | 0 1 | 0 | 1 | 0 |
|  | 1 0 | 0 | 0 | 1 |

M = 0

F I G. 27(B)

|  |  | B B R | | |
|---|---|---|---|---|
|  |  | 0 0 | 0 1 | 1 0 |
| COLOR CODES | 0 0 | 1 | 1 | 1 |
|  | 0 1 | 1 | 1 | 1 |
|  | 1 0 | 1 | 1 | 1 |

M = 1

F I G. 30
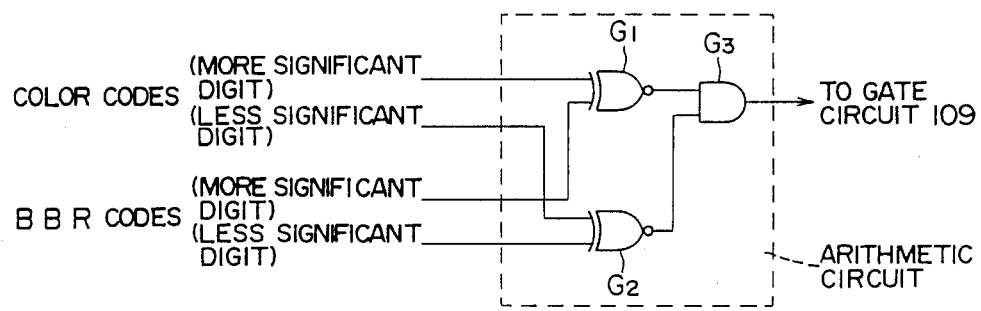
F I G. 31
|  |  | BBR CODES | | |
|---|---|---|---|---|
|  |  | RED | BLUE | BLACK |
| COLOR CODES | RED | 1 | 0 | 0 |
|  | BLUE | 0 | 1 | 0 |
|  | BLACK | 0 | 0 | 1 |
F I G. 32
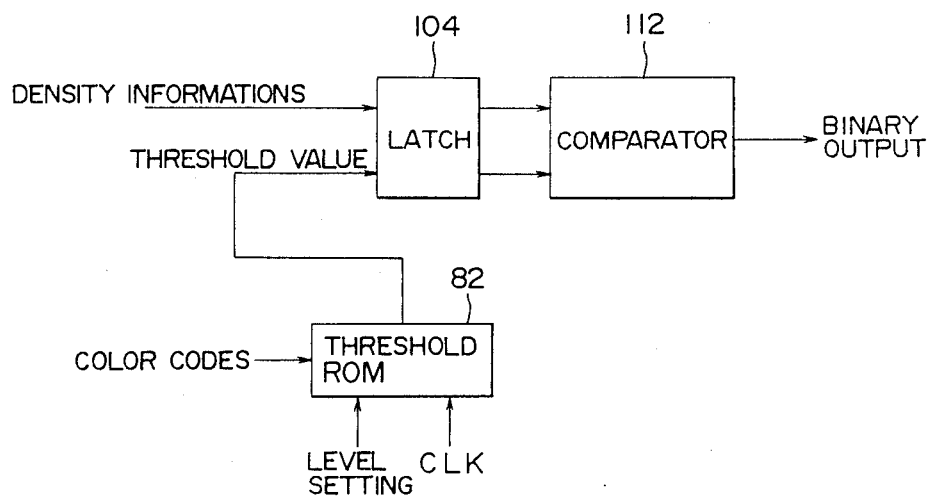

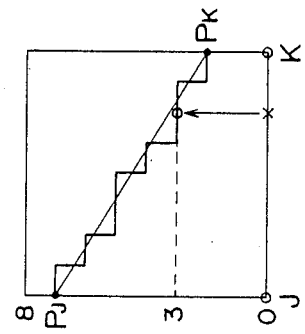
F I G. 34
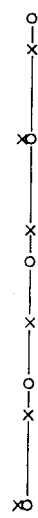
F I G. 33
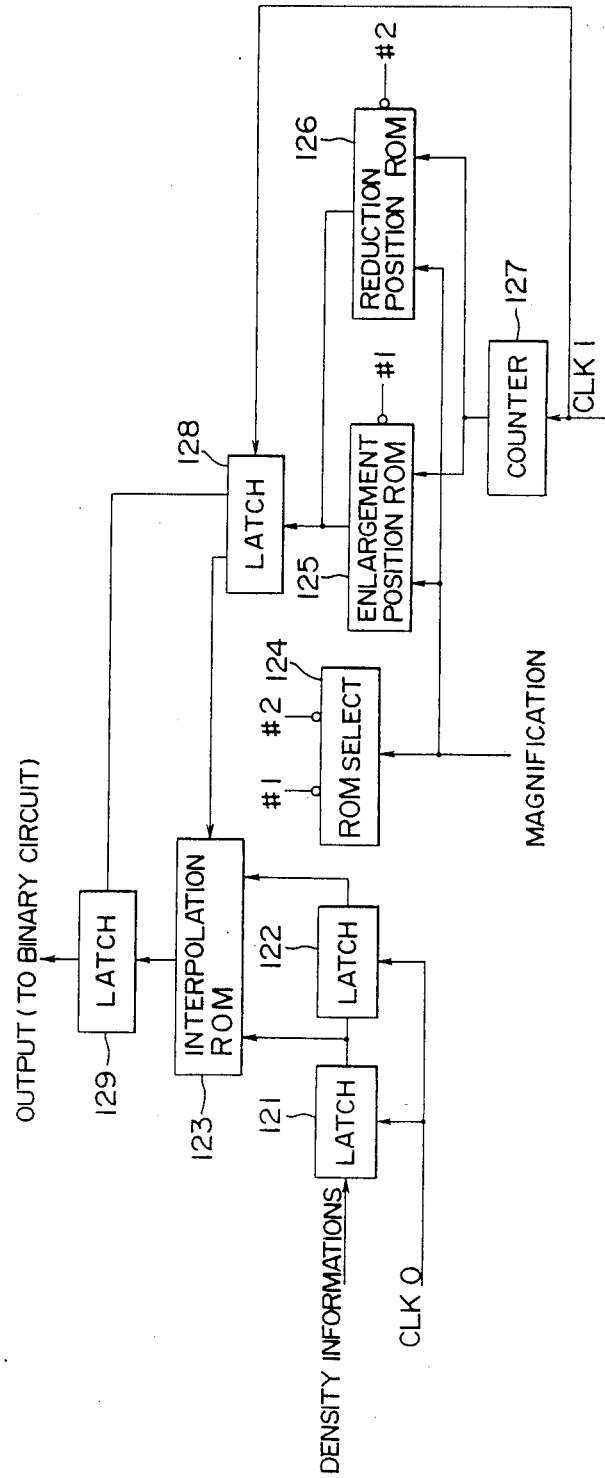
F I G. 35

FIG. 36

| WHITE | WHITE | WHITE |
|-------|-------|-------|
| WHITE | WHITE | WHITE |
| WHITE | WHITE | WHITE |

| WHITE | BLACK | BLACK |
|-------|-------|-------|
| WHITE | BLACK | BLACK |
| WHITE | BLACK | BLACK |

| BLACK | BLACK | WHITE |
|-------|-------|-------|
| WHITE | BLACK | BLACK |
| WHITE | WHITE | BLACK |

| BLACK | BLACK | BLACK |
|-------|-------|-------|
| BLACK | BLACK | BLACK |
| WHITE | WHITE | WHITE |

FIG. 37

| WHITE | WHITE | WHITE |
|-------|-------|-------|
| WHITE | WHITE | WHITE |
| WHITE | WHITE | WHITE |

| WHITE | WHITE | BLACK |
|-------|-------|-------|
| WHITE | WHITE | BLACK |
| WHITE | WHITE | WHITE |

| BLACK | BLACK | BLACK |
|-------|-------|-------|
| WHITE | WHITE | WHITE |
| WHITE | WHITE | WHITE |

| WHITE | BLACK | WHITE |
|-------|-------|-------|
| WHITE | WHITE | BLACK |
| WHITE | WHITE | WHITE |

F I G. 38
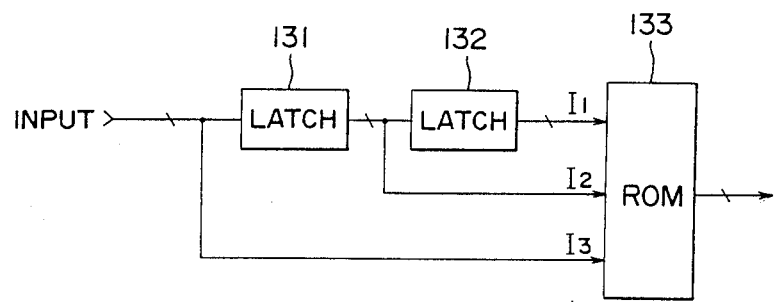
F I G. 39
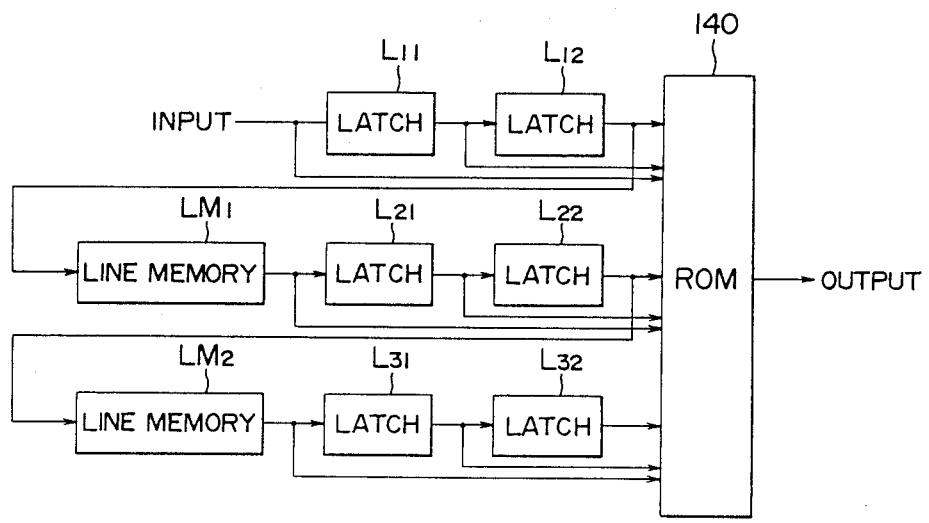

| COLOR CHANGE | COLOR CHANGE CODES |
|---|---|
| RED → BLACK | 0 0 0 0 |
| → BLUE | 0 0 0 1 |
| BLUE → RED | 0 0 1 0 |
| → BLACK | 0 0 1 1 |
| BLACK → RED | 0 1 0 0 |
| → BLUE | 0 1 0 1 |
| BLACK RED → BLUE | 1 0 0 0 |
| BLUE RED → BLACK | 1 0 0 1 |
| BLACK BLUE → RED | 1 0 1 0 |

| COLOR CODES | OUTPUT CODES |
|---|---|
| RED 1 0 | 0 0 |
| BLUE 0 1 | 0 1 |
| BLACK 0 0 | 0 0 |
| WHITE 1 1 | 1 1 |

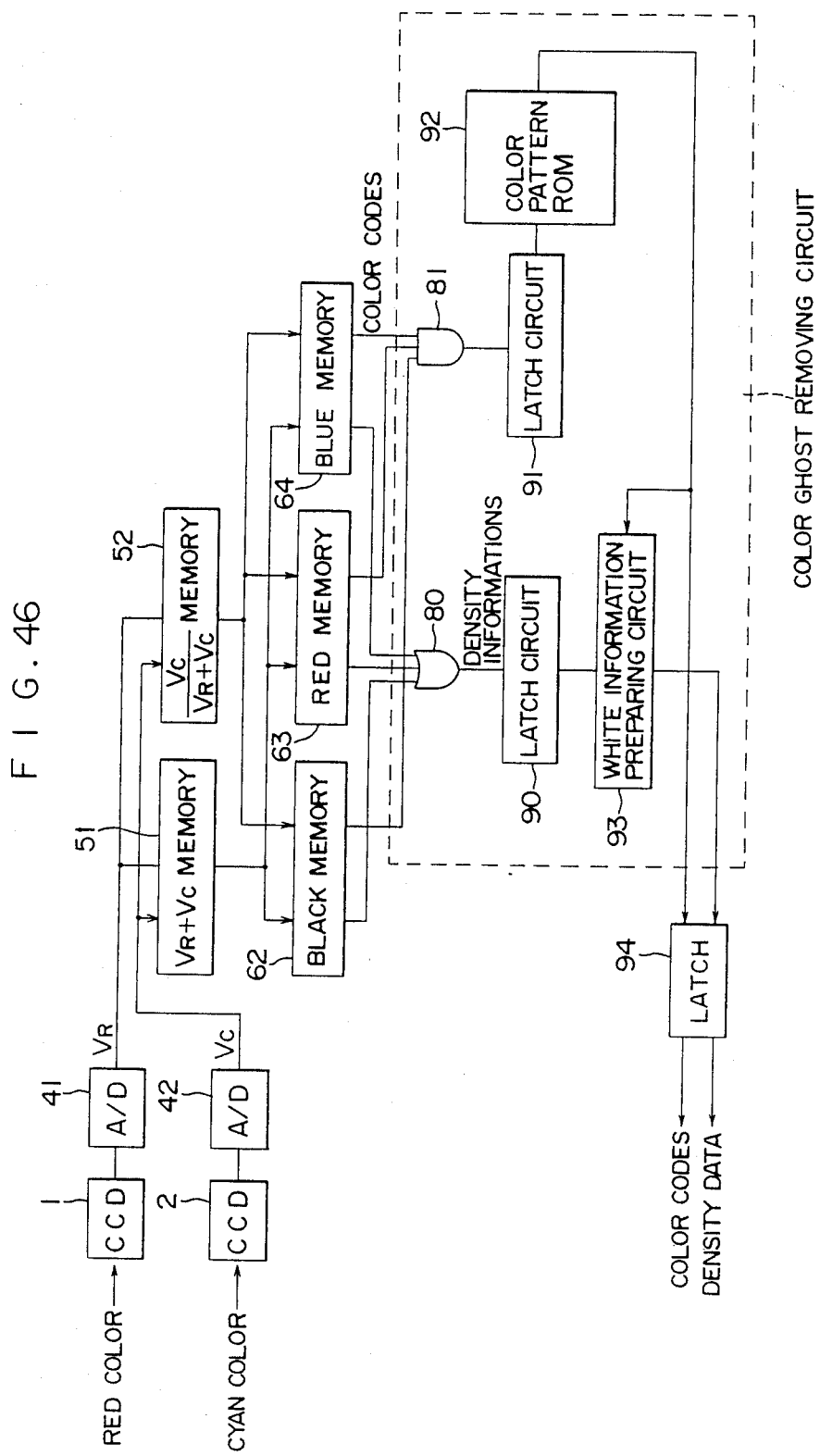
F I G. 46

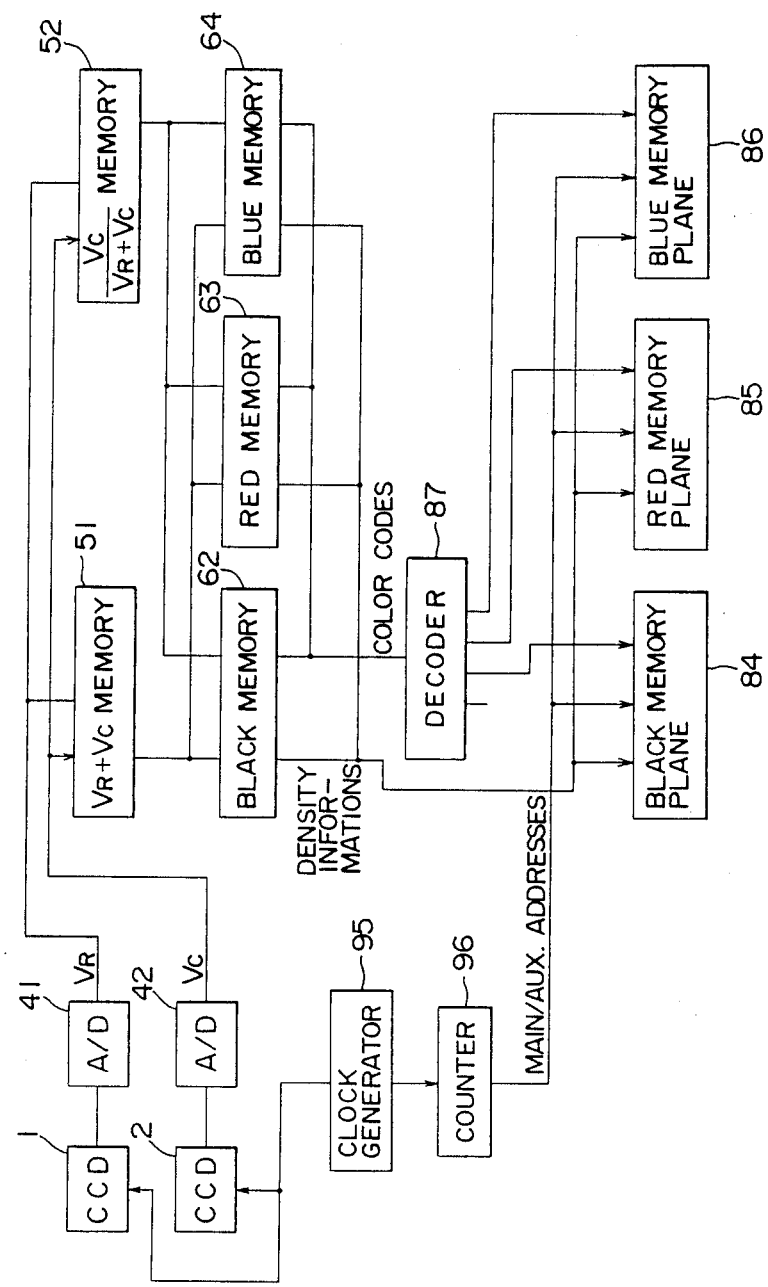
F I G. 50

F I G. 53
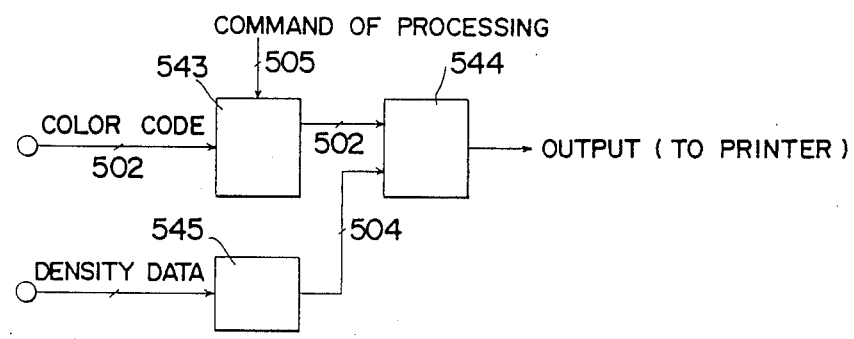
F I G. 54
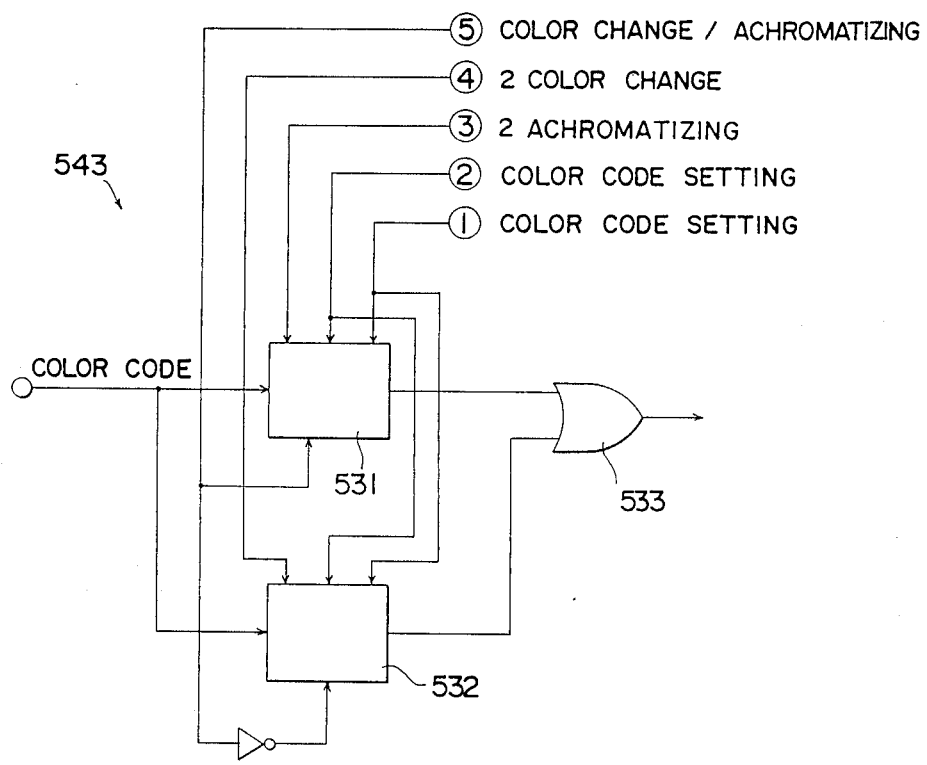

IMAGE PROCESSING TECHNIQUE FOR PROCESSING DIGITAL COLOR IMAGE INFORMATION

CROSS-REFERENCE TO RELATED APPLICATION

This application is a continuation in part of copending application Ser. No. 007,235, filed June 25, 1987, now abandoned.

BACKGROUND OF THE INVENTION

1. Field of the Invention

This invention relates to an image processing apparatus for a color copier or color facsimile and so on, particularly an image processing apparatus or method to process digital color image information.

2. Description of the prior Art

An image reproduction apparatus which reads optically an image of an original to obtain color image information, processes the color image information and reproduces the image of the original is well known. In this image reproduction apparatus, the image processing is conducted prevailingly for a digital image signal in separated plural processing circuits which are provided for individual colors, for example, primary colors, Blue Green and Red (in some cases, including black color). Accordingly, the image processing apparatus requires electronic circuit extremely complex and of large capacity.

This problem was a bar to use the image processing apparatus in an economic copier or facsimile.

On the other hand, in a simple image processing apparatus the image processing is conducted for a two-valued image signal. However, such an image processing apparatus has a disadvantage that the image processing is limited to only few items, for example, enlargement and reduction because the two-valued signal can not contain so much image information.

SUMMARY OF THE INVENTION

An object of the present invention is to provide an image processing apparatus or method having simple structure and high ability.

Another object of the present invention is to provide an image processing apparatus which has simple structure but can produce an image of high quality.

BRIEF DESCRIPTION OF THE DRAWINGS

FIGS. 1(A) to 1(C) present diagrams showing the reflectivities of individual color charts;

FIGS. 2 to 4 present diagrams showing examples of a color extraction map of individual color ranges;

FIG. 9 presents a diagram illustrating the positional changes of addresses in a ROM table;

FIG. 10 presents a diagram explaining generations of color ghosts;

FIG. 11 presents a diagram illustrating an example of a two-line pattern;

FIGS. 12(A) to 12(C) present diagrams tabulating color data after color extraction;

FIG. 17 presents a flow chart showing one example of the method of the present invention;

FIGS. 18(A) to 18(C) present diagrams illustrating examples of density data in individual color ranges;

FIGS. 19(A) and 19(B) present diagrams tabulating examples of a color pattern;

FIG. 22 presents a diagram illustrating an example of the color pattern;

FIG. 23 presents a diagram illustrating the scanning direction of a one-dimensional color pattern;

FIG. 25 presents a diagram representing examples of the dither matrix;

FIG. 26 presents a diagram tabulating the relations between color codes and threshold values;

FIGS. 27(A) and 27(B) present diagrams tabulating the operations of a color control circuit;

FIG. 30 presents a diagram showing one example of the construction of an arithmetic circuit;

FIG. 31 presents a diagram tabulating the outputs of the arithmetic circuit;

FIG. 32 presents a block diagram illustrating one example of a multiple-valued processing circuit;

FIGS. 33 and 34 present diagrams for explaining the principles of size enlargement and reduction;

FIG. 35 presents a block diagram showing one example of a variable power circuit;

FIGS. 36 and 37 present diagrams illustrating examples of 3×3 patterns;

FIGS. 38 and 39 present block diagrams illustrating examples of an image stressing circuit;

FIGS. 46 and 47 present block diagrams illustrating further embodiments of the present invention, respectively;

FIG. 50 presents a block diagram illustrating a further embodiment of the present invention;

FIG. 53 is a block diagram showing a circuit for color change and achromatizing;

FIG. 54 is a more detailed block diagram of the circuit shown in FIG. 53;

DESCRIPTION OF THE PREFERRED EMBODIMENTS

The present invention can be applied to an image reproduction apparatus which reproduces an image in full colors.

However, embodiments of the present invention explained hereinafter and shown in accompanied drawings are ones that an image is reproduced in predetermined specific colors, for examples blue, red and black.

Figure 52:
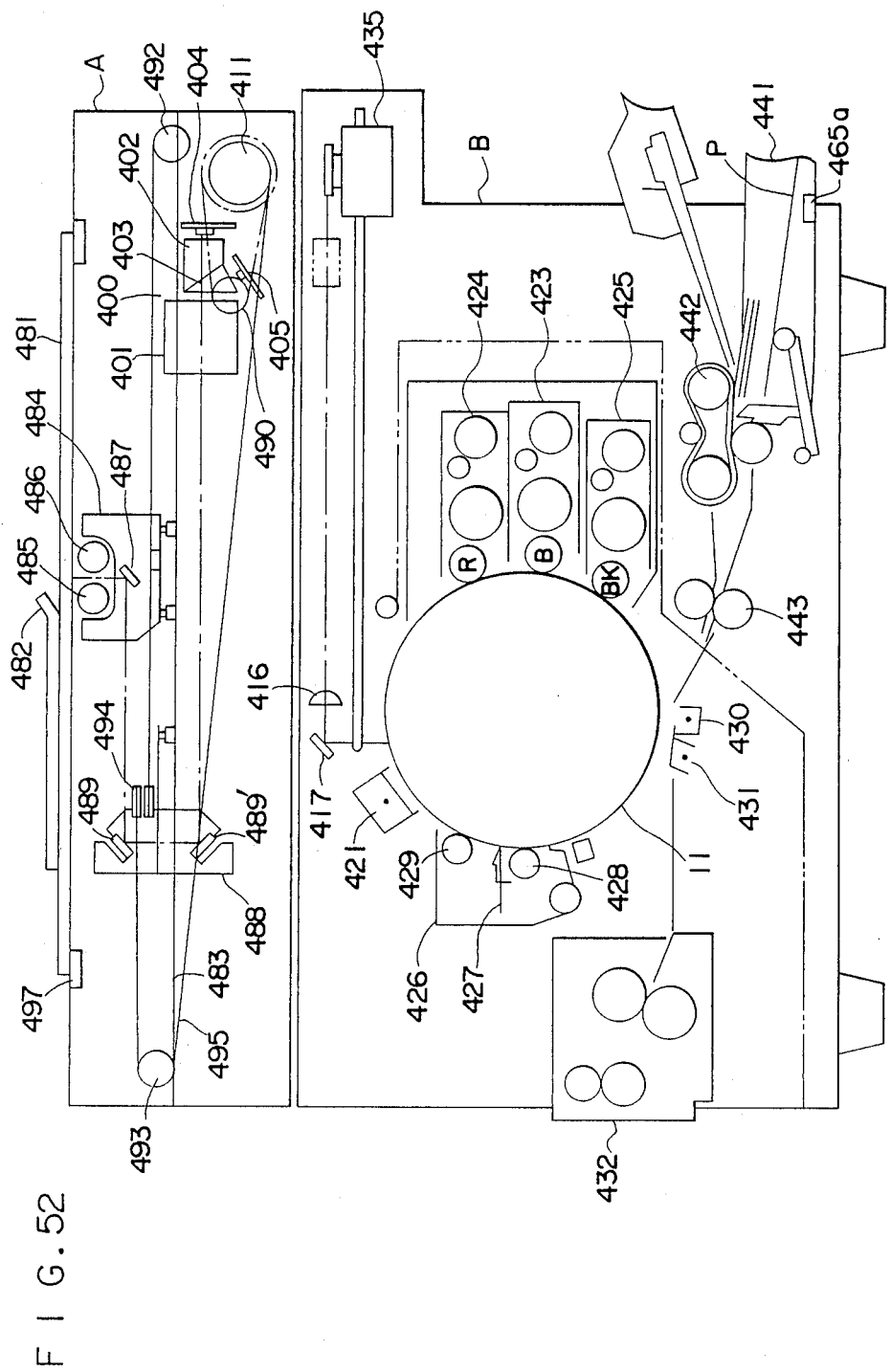
FIG. 52 presents a color copying apparatus in which the present invention is applied.

FIG. 52 shows an color copying machine in which an image processing apparatus according to the present invention is incorporated.

The color copying machine separates chrominance information into distinct three color information to print an image with the three colors. In this embodiment, the three colors are black, red and blue (respectively denoted by BK, R and B).

With the machine turned on, the document reading unit A is driven.

The first step is to read the document 482 on the document table 481 is optically scanned by the optical system. The optical system consists of the fluorescent lamps 485 and 486, the carriage 484 with the reflecting mirror 487, and movable mirror unit 488 with the V mirrors 489 and 489'.

The carriage 484 and the moving unit 488 travel on the slide rail 483 by the stepping motor 490 at the predetermined speeds and in the predetermined directions.

The fluorescent lamps 485 and 486 illuminate the document 482 on the mirror 487; the image is then supplied to the optical information conversion unit 400 through the V mirrors 489 and 489'.

To prevent optical emphasis and attenuation to a specific color in light scanning of a color document, warm white fluorescent lamps are used for the fluorescent lamps 485 and 486. Furthermore, to allow stable illumination, these fluorescent lamps are turned on or driven by a high-frequency power supply of approximately 40kHz. These lamps are kept warm by a stabilizer-used heater to ensure a constant temperature of their tube walls or to improve warm-up performance.

On the rear side of the left edge of the platen glass 481 there is the standard white plate 497 on which optical scanning is made to normalize the image signal into the equivalent white signal.

The optical information conversion unit 400 consists of the lens 401, the prism 402, the dichroic mirror 403, the CCD 404 on which red-color-separated image is projected and the CCD 405 on which cyan-color-separated image is projected.

The optical signals from the optical system are focused by the lens 401; they are then separated by the dichroic mirror of the prism 402 into red-color information and cyan-color information.

Each of these color-separated images is formed on each CCD's receiving surface, whereby the image signal is converted into the electric signal. The image signal processed by the signal processing system; each chrominance signal is supplied to the printing unit B.

As shown in FIG. 52, the signal system includes not only the analog/digital converting means, but also such signal processing circuits as the color separating means and digitizing means.

The printing unit B possesses the deflecting unit 435. The deflecting unit 435 can be a galvano mirror, rotating polygon mirror, or a deflecting unit with a quartz-used optical deflector. Laser beam modulated by chrominance signal is deflected and scanned by the deflecting unit.

Upon the start of deflection and scanning, beam scan is detected by the laser index sensor (not illustrated) and beam modulation starts by the first chrominance (blue signal, for example). The modulated beam is so controlled that it scans the image forming unit (i.e., sensitizing drum) 11 which has uniform charge.

The primary scan by the deflection of a laser beam and secondary scan by the rotating image forming unit 11 form a electrostatic image corresponding to the first chrominance signal on the image forming unit 11.

The electrostatic image is developed by the developing unit 423 that contains blue toner. The predetermined bias voltage from the high-voltage source is applied to the developing unit 423. This development forms blue image.

Toner is supplied as required according to the directive signal from a CPU (not illustrated) for system control which controls a toner supplying means (not illustrated).

The blue toner image rotates with contact of the cleaning blade 427 released. Like the first chrominance signal, electrostatic image is formed based on the second chrominance signal (red signal, for example). By use of the developing unit 424 accommodating red accommodating, this is developed for form red toner image.

Of course, the predetermined bias voltage is applied from the high-voltage power supply to the developing unit 424.

Likewise, electrostatics image is formed based on the third chrominance (black) signal, and black toner image is formed based on chrominance (black) signal.

This means a multiple-color toner image has been formed on the image forming unit 11.

The above description is related to the forming of 3-color toner image; and of course this is applicable to the forming of 2- or 1-color image.

The example of development is a so-called non-contact 2-component jumping development in which each toner is jumped toward the image forming unit 11, with ac/dc bias voltage (from the high-voltage power supply) applied.

The predetermined amount of toner is supplied to each of the developing unit 424 and 425 according to the directive signal from the CPU.

On the other hand, the recording paper P supplied by the paper feeding unit 441 through the feeding roll 442 and the timing roll 443 is carried onto the image forming unit 11, with its timing being in line with the revolution of the image forming unit 11. Then, multi-color toner image is transferred onto the paper by the transferring electrode 430 to which high voltage is applied to the high voltage supply and it is separated by the separating electrode 431.

The recording paper P is then conveyed to the fixing unit 432 for obtaining color image by fixing.

After the process of transfer, the image forming unit 11 is cleaned by the cleaning unit 426 for preparations for the next image forming.

To facilitate toner collection by the blade 427 of the cleaning unit 426, the predetermined dc voltage is applied to the metallic roll 428. This metallic roll 428 is arranged close to but non-contacting with the surface of the image forming unit 11.

After cleaning, the blade 427 is released from the contact state. The auxiliary cleaning roller 429 is installed to eliminate residual toner left after the release. The roller 429 is revolved and contacts in the direction opposite to the image forming unit 11 to satisfactorily clean and remove residual toner.

The paper feeding unit 441 is equipped with the sensor 465a from which the detection output is forwarded to the CPU.

Above-mentioned operation is controlled by a system controller (not shown). As explained above, the developing units operate in the order of unit 423 (blue) - unit 424 (red) - unit 425 (black).

On the otherhand, the system controller generates a signal which indicates the order of the color image forming. This signal is used as a color select signal B.B.R. which is explained hereinafter.

FIG. 17 is a flow chart showing an embodiment of the method according to the present invention.

First, (1) color extraction and (2) the construction of a color image signal used in the image processing according to the present invention will be explained hereinafter before the flow chart is explained.

(1) Color extraction

The color extraction is a process wherein an image signal which carries full color information is converted to another image signal which carries information of predetermined several colors, for examples, black, blue and red. In this color extraction process, colors of a color image are sorted into several distinct colors.

FIG. 1 presents color charts depicting the spectral reflectivity characteristics of the achromatic, blue and red colors, respectively. FIGS. 1(A), 1(B) and 1(C) show the respective reflectivity characteristics (%) of the achromatic, blue and red colors against the wavelength (nm). Moreover, curve f1 plots the characteristics of a sample whereas curve f2 plots the characteristics of a reference density plate (or a white density plate).

As is apparent from the drawing, there are large difference in the spectral characteristics among the individual colors. Normalization is made with the output value of the white density plate (which has a reflectivity of 90%) providing a reference. Now, the output values of the red and cyan channels are designated at $V_{RW}$ and $V_{CW}$, respectively. The spectral characteristics of this reference density plate is desirably flat and is schematically indicated at f2 (by a single-dotted line). The dichroic mirror used has spectral characteristics cut off at 600 nm, across which the longer-wavelength light is incident on the red channel whereas the shorter-wavelength light is incident on the cyan channel. If the red and cyan channels of a color sample have output values $V_{R'}$ and $V_C$, respectively, the image data $V_R$ and $V_C$ to be actually used are expressed as follows:

$$V_R = V_{R'}/V_{RW};$$

and $$V_C = V_C/V_{CW} \qquad (1).$$

Since the image data $V_C$ and $V_R$ are thus individually normalized with the white color having the reference density:

$$0 \leq V_R \leq 1.0;$$

and $$0 \leq V_C \leq 1.0.$$

Hence, the reflectivities (or the reflection densities) of an original are confined for all the colors within at 0=Black paper Level and 2.0=White Paper Level by using the following range as a measure expressing the so-called "luminance signal":

$$0 \leq V_R + V_C \leq 2.0.$$

Thus, the luminance signal information can be expressed follows:

$$V_R + V_C \qquad (2).$$

Here, since the spectral characteristics of an achromatic image are generally flat, as shown in FIG. 1(A):

$$V_{R'}/V_{RW} \approx V_C/V_{CW} \rightarrow V_R \approx V_C \qquad (3).$$

Since a chromatic image exhibits peculiar characteristics:

for red colors:

$$V_{R'}/V_{RW} > V_C/V_{CW} \rightarrow V_R > V_C;$$

and for cyan colors:

$$V_{R'}/V_{RW} < V_C/V_{CW} \rightarrow V_R < V_C \qquad (4).$$

The ratio $V_R/V_C$ or $V_C/V_R$ can be simply adopted as the axis expressing the difference in colors.

In this case, the color extraction can be made as follows:

for black colors:

$$V_R/V_C \approx 1.0, \text{ or}$$

$$V_C/V_R \approx 1.0;$$

for cyan colors:

$$0 \leq V_R/V_C < 1.0, \text{ or}$$

$$1.0 < V_C/V_R \approx \infty;$$

and for red colors:

$$1.0 < V_R/V_C \approx \infty, \text{ or}$$

$$0 \approx V_C/V_R < 1.0 \tag{5}$$

As shown in FIG. 2, however, the handling is inconvenient because a symmetry is not obtained with respect to an achromatic axis Z. In FIG. 2, the ordinate indicates the luminance information ($V_R + V_C$), and the abscissa indicates the color difference information ($V_R/V_C$). In this case, the color difference information ($V_R/V_C$) diverges to infinity, as is apparent from the formulas (5). It is, however, understood that the black, cyan and red colors can be extracted by thus determining any ratio between the image data $V_R$ and $V_C$. Therefore, the color extractions by the differences in the ratio of the red and cyan components contained in the whole luminance signal will be examined.

Since an achromatic color has the flat spectral characteristics, as shown in FIG. 1(A), $V_R \approx V_C$ holds, as expressed in the foregoing equation (3). Therefore, the quantities of the image data $V_R$ and $V_C$ contained in the luminance signal, i.e., the total quantity of light ($V_R + V_C$) are equal. In other words, the following equations hold in the black (or achromatic) colors:

$$V_R/(V_R + V_C) \approx 0.5;$$

and $$V_C/(V_R + V_C) \approx 0.5 \tag{6}$$

In a chromatic color, on the contrary, the quantities of the image data $V_R$ and $V_C$ contained in the total quantity of light ($V_R + V_C$) are different. In other words: for the red colors:

$$0.5 < V_R/(V_R + V_C) \leq 1.0;$$

and $$0 \leq V_C/(V_R + V_C) < 0.5 \tag{7}$$

for the cyan colors $$0 \leq V_R/(V_R + V_C) < 0.5;$$

and $$0.5 < V_C/(V_R + V_C) \leq 1.0 \tag{8}$$

Thus, the black, cyan and red colors can be clearly extracted by adopting the ratio $V_R/(V_R + V_C)$ or $V_C/(V_R + V_C)$ as the axis expressing the color difference. Since the ratio of $V_R$ or $V_C$ to ($V_R + V_C$) is determined according to this method, a symmetry is obtained with respect to the achromatic axis Z, as shown in FIG. 3, so that no divergence results, as different from the above. If the ratio $V_C/(V_R + V_C)$ is used as the color difference axis, the individual colors can be clearly extracted as follows:
for the red colors:

$$0 \leq V_C/(V_R + V_C) < 0.5;$$

for the black colors:

$$V_C/(V_R + V_C) \approx 0.5;$$

and
for the cyan colors:

$$0.5 < V_C/(V_R + V_C) \leq 1.0 \tag{9}$$

As described above, the color difference signal information can be expressed as follows:

$$V_R/(V_R + V_C);$$

or $$V_C/(V_R + V_C) \tag{10}$$

Next, the ranges of the black, cyan and red colors are determined on the basis of the aforementioned color extraction method. A pure black and gray would be positioned on the achromatic axis Z as shown in FIG. 3. As a matter of fact, however, existing achromatic colors are within a region having a width in the neighborhood of 0.5 with respect to the ratio $V_C/(V_R + V_C)$ because black color and gray of various hue are present. Moreover, the black colors belong the region having a small value with respect to the value ($V_R + V_C$). As a result, the black (or achromatic) color range basically takes a T-shaped form, as shown in FIG. 4, although it has more or less irregularities. The hatched region belongs to the black (or achromatic) range.

The image information obtained by optical scanning of an original is digitalized with a predetermined threshold levels. It is necessary to clear the correspondences between the values ($V_R + V_C$) and the reflection densities of the original for the individual black, cyan and red color ranges. For this necessity the correspondence between the luminance signal information ($V_R + V_C$) and the reflection density is made for each range of the black, cyan and red colors. For this correspondence, the density measured results are compared with the various charts which have their colors separated and plotted on maps. And, the density correspondences are expressed in 4 bits (or at 16 levels) of 0 to 2.0. If the 16 levels are coded in a hexadecimal notation, the density correspondences are shown for the individual color ranges in FIG. 5.

Figures 5, 6:
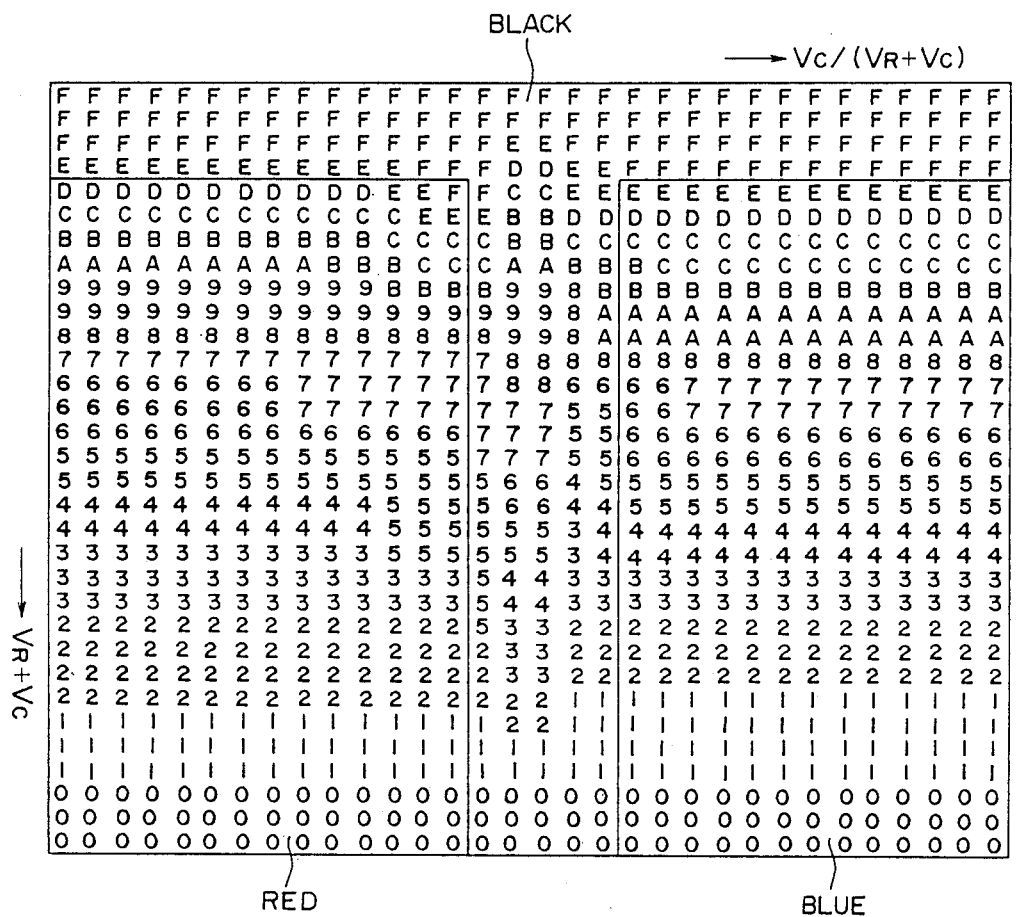
FIG. 5 presents a diagram tabulating density corresponding values of the individual color ranges.
FIG. 6 presents a diagram tabulating an example of the color extraction map.

The color extraction maps (i.e., the density correspondences in a ROM) corresponding to the color ranges shown in FIG. 4 are prepared on the basis of the density correspondences shown in FIG. 5 and are presented in FIG. 6. Thick lines appearing in FIG. 6 represent the boundaries of the color range regions.

Through the color extraction process as explained above, colors are sorted to predetermined specific colors, for example, achromatic color, red color and blue color.

Image reproduction is conducted in colors which respectively correspond to the predetermined specific colors.

In a preferred embodiment of the present invention, the colors of the reproduced image are red (corresponding to the extracted red), blue (corresponding to the extracted cyan) and black (corresponding to the extracted achromatic color).

FIG. 4 shows a color map of the extracted color wherein color regions are respectively named as "BLACK", "RED" and "BLUE" because of colors of reproduced image.

By the same reason as above, image signals after the color extraction process are named as black, red and blue color image signals.

Figure 7:
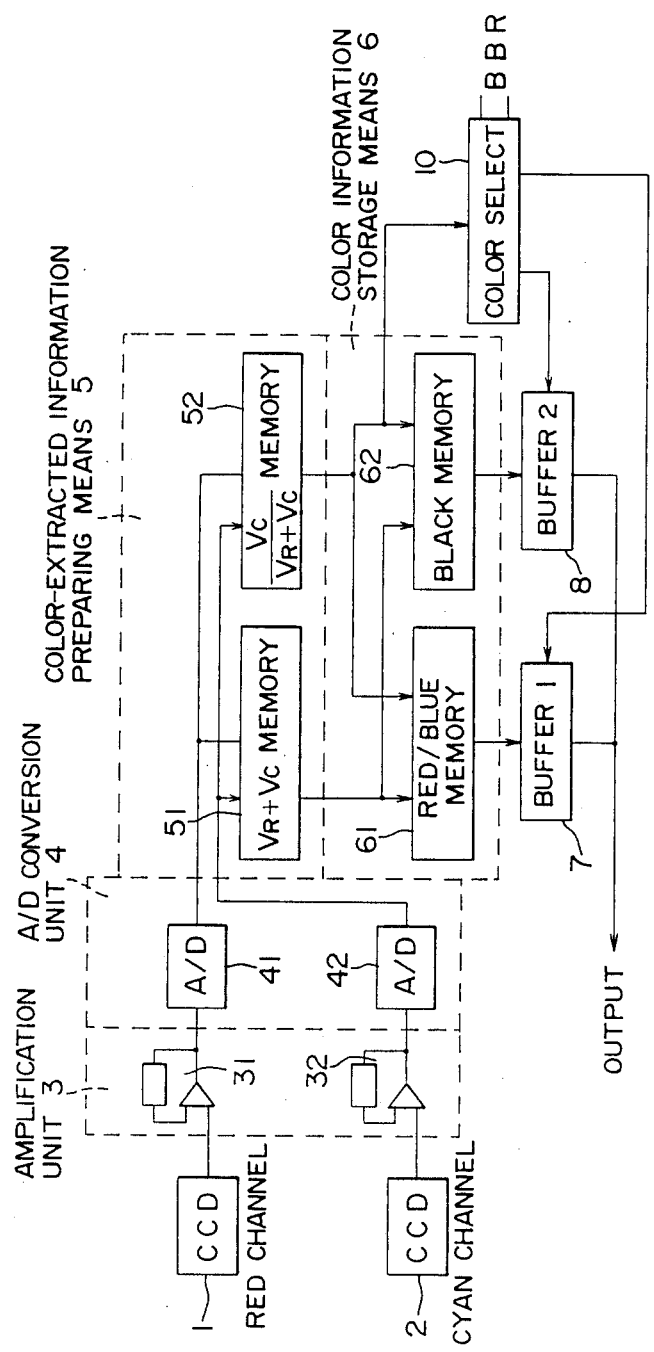
FIGS. 7 and 8 present block diagrams showing circuit examples of the apparatus of the prior art.
Figure 8:
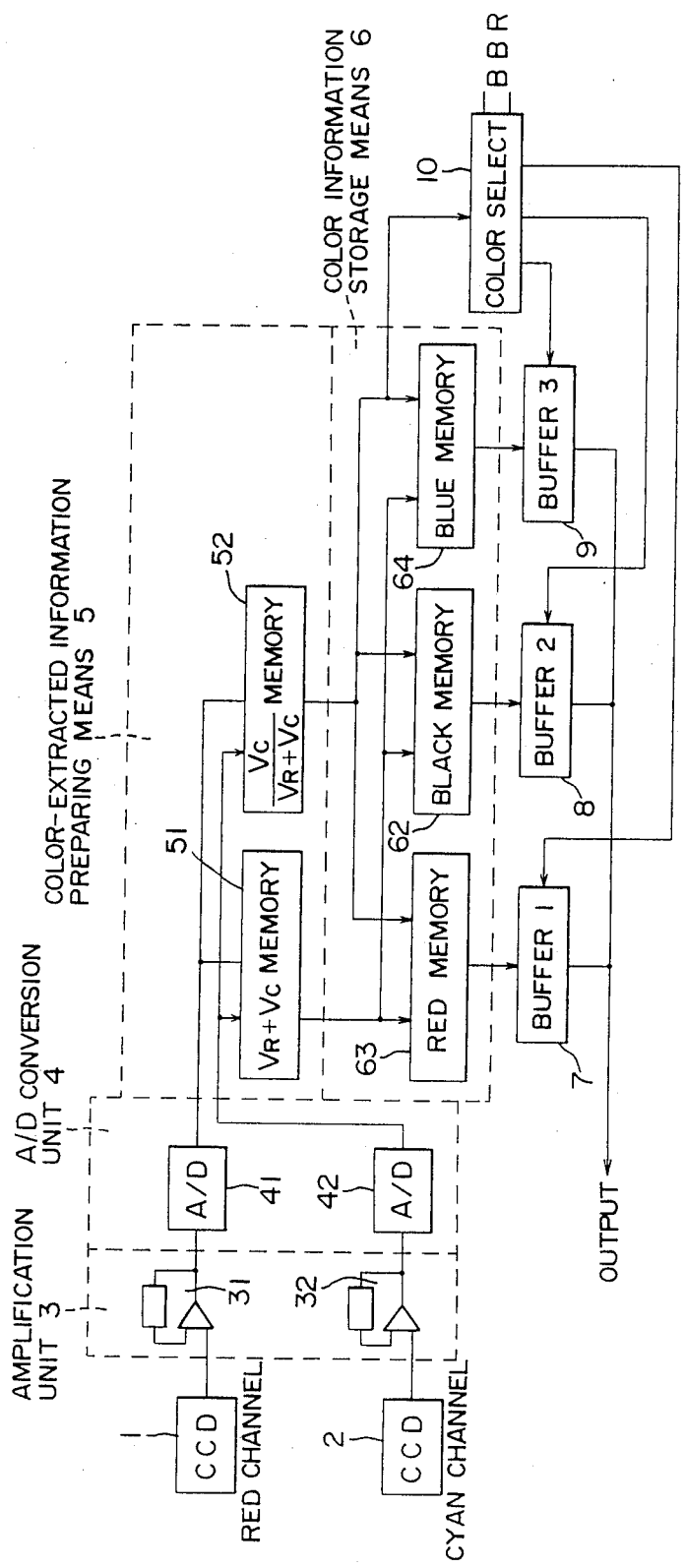

FIGS. 7 and 8 are block diagrams showing examples of the structure of the image processing circuit of the prior art based on the color extraction maps shown in FIG. 6.

First of all, the circuit of FIG. 7 will be described in the following. An optical image is separated into a red channel and a cyan channel by a color-separating optical system (although not shown). These red and cyan channels are then photoelectrically transduced by a CCD 1 and a CCD 2 and are amplified by the amplifiers 31 and 32 of an amplification unit 3, respectively. The signals thus amplified enter an A/D conversion unit 4 and are converted into digital data, respectively, by A/D converters 41 and 42.

The output $V_R$ of the A/D converter 41 and the output $V_C$ of the A/D converter 42 enter color-extracted information preparing means 5 and are given as addresses to a $(V_R+V_C)$ memory 51 and a $[V_C/(V_R+V_C)]$ memory 52, respectively. The $(V_R+V_C)$ memory 51 outputs the $(V_R+V_C)$ data corresponding to the input address, whereas as the $[V_C/(V_R+V_C)]$ memory 52 outputs the $[V_C/(V_R+V_C)]$ data corresponding to the input address. These data enter color information storing means 6 and are given as addresses to a red/blue memory 61 and a black memory 62, respectively.

These red/blue memory 61 and the black memory 62 are stored with the density correspondences for the individual color ranges of the color extraction map shown in FIG. 6 so that the density values corresponding to the input addresses are outputted and stored in buffers 7 and 8. The density correspondences stored in these buffers 7 and 8 are selected by a color select circuit 10 which is controls the buffers 7 and 8 in response to a color select signal B.B.R. The circuit structure shown in FIG. 8 is similar to that of FIG. 7 except that the memories for storing the density correspondences are divided for the individual color ranges such as a red memory 63, a black memory 62 and a blue memory 64 so that buffer memories 7, 8 and 9 are accordingly added.

(2) The construction of a color image signal used in the image processing according to the present invention.

In the method of the present invention, color codes expressing individual colors are added to the density corresponding values (i.e., density informations) shown in FIG. 9.

Therefore, the color image signal used in the present invention comprises a plurality of bits a part of which represents color and another part of which represent density.

The color designating color codes are defined for white, red, blue and black colors as follows:

White=(1, 1)=1×2+1=3;

Black=(0, 0)=0+0=0;

Red=(1, 0)=1×2+0=2; and

Blue=(0, 1)=0+1=1.

Then, the density corresponding value having a value D in FIG. 6 changes as follows:

| (Prior Art) | (Present Invention) |
|---|---|
| D → | 0D (Black) |
|  | 2D (Red) |
|  | 1D (Blue). |

In the black memory, for example, the data are written in the following form in the T-shaped region:

$OX(X=0$ to $F)$.

A white code corresponding value "30" is written in the regions other than the T-shaped region.

Thus, there is prepared a color extraction map of the type, in which the density data in each color region shown in FIG. G is replaced by the following one:

Density data+Color codes.

Incidentally, the color codes need always be added not before but after the density data.

FIG. 17 is a flow chart showing an embodiment of the method according to the present invention.

Step 1

An image of an original is separated into red and cyan color images by a color separating optical system and these images are read by CCDs.

The resultant color image signals are designated at $V_R$ and $V_C$.

Step 2

A luminance information signal $(V_R+V_C)$ and a color difference signal $\{V_C/(V_C+V_R)\}$ are calculated from the $V_R$ and $V_C$.

Step 3

Color extraction memories are accessed by the signals $(V_R+V_C)$ and $\{(V_C/(V_C+V_R)\}$ to obtain a second color image signal which comprises color code and density data.

The color extraction memories which store the data of the color map shown in FIG. 6 are prepared in advance.

Step 4

The second color image signal is processed to conduct image processings which are explained hereinafter.

Various image processings will be explained hereinafter. These image processings are conducted with use of the above-explained color image signal according to the present invention.

The image processings contain the following items but the image processing in the present invention should not be limited to these items:

(1) Correction of color ghost
(2) Multi valuation of an image signal
(3) Enlargement and reduction
(4) Making lines thinner of thicker
(5) Image emphasis and MTF (modulation transfer function) correction
(6) Gradation change
(7) Achromatism and
(8) Color change.

(1) Correction of color ghost

In the case of the aforementioned color extraction of image data, the following calculations are made on the basis of the outputs $V_R$ and $V_C$ of the two CCDs:

as the luminance signal information:

$$(V_R + V_C) \quad (11);$$

and as the color difference signal information:

$$V_C/(V_R + V_C) \quad (12).$$

By using these values as the addresses, the color extracting ROM shown in FIG. 6 is accessed to. If, either or both of the outputs of the CCDs has any error, the color extracting ROM will be erroneously accessed.

Now, let it be assumed for simplicity that both the image data $V_R$ and $V_C$ change an infinitesimal quantity $\Delta (\Delta < V_R, V_C)$. If the data after the change are designated at $V_{R'}$ and $V_{C'}$, these values $V_{R'}$ and $V_{C'}$ are expressed by the following equations, respectively:

$$V_{R'} = V_R + \Delta;$$

and $$V_{C'} = V_C + \Delta \quad (13).$$

Hence:

$$V_{R'} + V_{C'} = V_R + V_C + 2\Delta \quad (14);$$

and $$V_{C'}/(V_{R'} + V_{C'}) \quad (15)$$
$$= V_C[1 + (\Delta/V_C)] \times \quad (15)$$
$$1/[V_R + V_C \times [1 + (2/(V_R + V_C))]]$$
$$= [V_C/(V_R + V_C)] +$$
$$[(V_R - V_C)\Delta/(V_R + V_C)^2].$$

As a result, the addresses of the color extracting ROM are different by the third term of the equation (14) and the second term of the equation (15). From these equations (14) and (15), both the addresses of $V_R + V_C$ and $V_C/(V_R + V_C)$ will change in the increasing direction if the original image is in a red color, and the addresses $V_C/(V_R + V_C)$ will change in the decreasing direction if the original image is in a blue color. FIG. 9 is a diagram showing the positional changes in the ROM table at this time.

In case the CCD output fluctuate from the normal value, as described above, the addresses in the color extracting ROM will change. As a result, if the original image has its colors in the neighborhood of the boundaries of the individual colors in the color extraction map, its colors will change due to the output fluctuations (as shown in FIG. 10). The unwanted colors thus generated are called the "color ghosts".

(a) Causes for Generating Color Ghosts

The causes for generating the color ghosts are enumerated as follows:

(1) pixel displacement between two CCDs (due to unadjustment in mounting the CCDs);

(2) Change in magnifications between optical systems;

(3) Chromatic aberration of lens; and (4) Superposition of noise components other than image signals on the CCD outputs.

Figure 13:
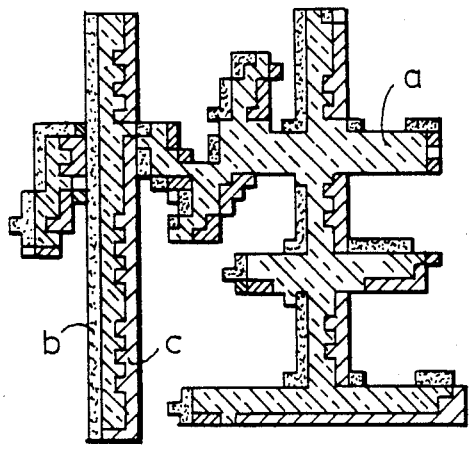
FIG. 13 presents a diagram illustrating an example of a color ghost image.
Figure 14:
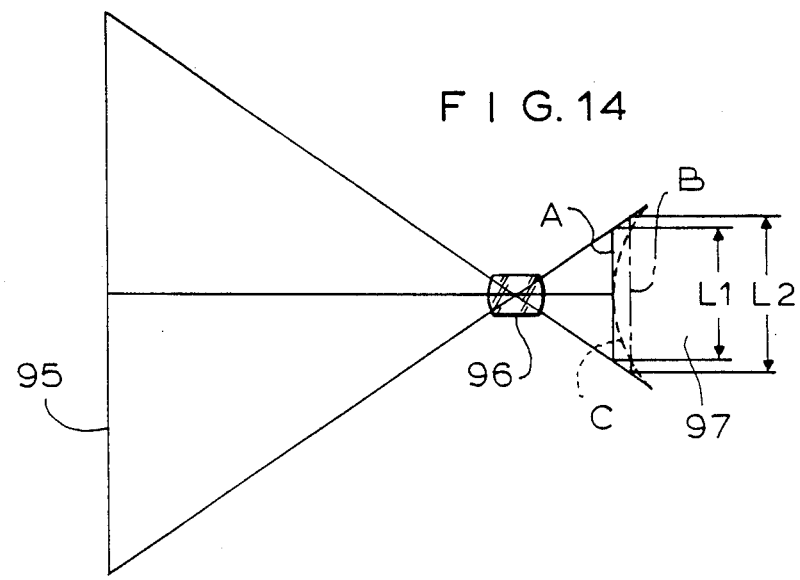
FIG. 14 presents a diagram for explaining the pixel displacements when the magnification of a lens is not adjusted.

Of these, the cause (1) is due to the problem of the mounting accuracy of the plural CCD image sensors. These image sensors are necessary and very difficult to have their positions adjusted in an order lower by one than their pixel size (which is usually 7 $\mu \times 7$ $\mu$ or 14 $\mu \times 14$ $\mu$). This accuracy also has to be maintained even during use/transportation and is an important target for the design of a color image pickup apparatus using the plural CCDs. The individual causes thus enumerated will be explained in the following:

(A) pixel displacement between two CCDs:

If the pixels of two CCDs (e.g., cyan and red CCDs) are displaced by one when they are mounted, as shown in FIG. 11, the output, which should be in the series of white - black - black - white, will be in the series of white - blue - black - red - white, as shown in FIG. 12(A) (wherein W represents "white"), when two black lines are picked up. Thus, colors different from those of the original will be outputted. At this time, it is difficult to accurately adjust the single pixel so that pixel displacements of $\frac{1}{4}$ or $\frac{1}{2}$ will result. As a result, for a small pixel displacement (which is thought to be generally within $\frac{1}{4}$ pixel), the output fluctuations are little influenced so that the color ghosts are hard to result. For a large pixel displacement, on the contrary, the color ghosts are generated such that the output is from the series of white - black - black - red - white to the series of white - blue - black - black - red - white. The line patterns of red and blue colors are similar, as shown in FIGS. 12(B) and 12(C). Here, since the color ghosts are generated as a result of the influences of the output fluctuations, it can be concluded that a color apart from the color boundary in the color extraction ROM table is difficult to experience the color ghosts. Generally speaking, since the color extraction has a narrow range for the black color, as shown in FIG. 6, the color ghosts become liable to appear. FIG. 13 illustrates a color ghost image in which a pixel displacement of $\frac{1}{2}$ pixel is caused. In FIG. 13: region(a) represents an intrinsic black region; region(b) represents a red ghost region; and region(c) represents a blue ghost region. (B) Change in magnification between optical systems:

In reading of a color image, generally speaking, it is desirable that the focal points of the individual colors R, G and B be located at the same position. When in the lens design or working, on the other hand, the focal points are generally different for the individual colors. Of the three colors, R, G and B (i.e., C, E and F lines), two could have an identical focal point, but the remaining one would be different From the standpoint of the lens working, on the other hand, the focal point could be aligned with the optical axis but would gradually deviate at a large height of the image. If, at this time, the mounting position of each CCD is determined stressing the focusing, for example, the magnification factor becomes so different that the pixel displacement will appear effectively the larger for the position the closer to the edge of the CCD. The causes described above will generate the color ghosts, as shown in FIG. 14. The reflected beam (or optical image) of an original document 95 is condensed by a lens 96 and focused on a CCD 97. In FIG. 14, letter A represents a normal focal point, and letter B a CCD position mainly ior the focusing purpose. Broken curve C indicates the focal plane of the lens, and letters $L_1$ and $L_2$ indicate the normal length and the length mainly for the focusing purpose, respectively. If a CCD for reception of a cyan image and a CCD for reception of a red image are mounted in the positions A and B, respectively, the original image is elongated in the CCD receptive of the red image. As a result, the color ghosts become he more serious as the image is the closer to the edge of the CCD. FIG. 14 presents an example in which the lens is rather over. If the lens is rather under, on the contrary, the image becomes shorter to invite similar effects.

Figure 15A:
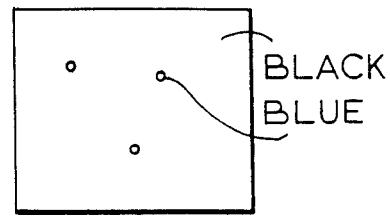
FIGS. 15(A) and 15(B) present diagrams illustrating examples of the color ghost image.
Figure 15B:
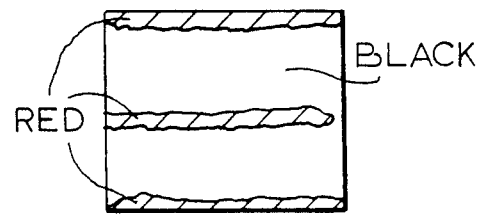

(C) Superposition of noise components:

In case sudden or low-frequency noises are superposed on one or both of two outputs $V_R$ and $V_C$, the color ghosts (in the form of dots) are locally generated in the former case and over a wide range in the latter case. FIGS. 15 are diagrams showing the states in which the color ghosts are generated. FIG. 15(A) illustrates the state of the color ghosts in case the sudden noises are superposed, and FIG. 15(B) illustrates the state of the color ghosts in case the low-frequency noises are superposed. In the case of FIG. 15(A), the sudden noises are generated in the solid black portion to generate the dotted blue color ghosts. In the case of FIG. 15(B), the color ghosts are generated in the solid black portion over a (hatched) wide red range.

As has been described hereinbefore, the color ghosts are generated for the various causes at the color image processing step. The countermeasures for the color ghosts have been tried in various manners in the prior art. Most of the countermeasures for the color ghosts in the prior art are devoted to binary image data after the color extraction but cannot be applied to an image data having 6 to 8 bits for one pixel, for example. The countermeasure of the prior art has a drawback that it is difficult to judge what color makes the ghost image if the color number increases to as many as three to seven.

For example, the invention disclosed in Japanese patent Laid-Open No. 128872/1984 removes the color ghosts by storing in a corresponding manner the combination of the colors of pixels around a pixel noted and the inferred color of the noted pixel and by logically operating the informations of the color of the noted pixel and the inferred color to determine the color of the noted pixel. At this time, the image data are in two binary colors, and the logical operation prefers the black color because of necessity for cleaning the black image.

Figure 16A:
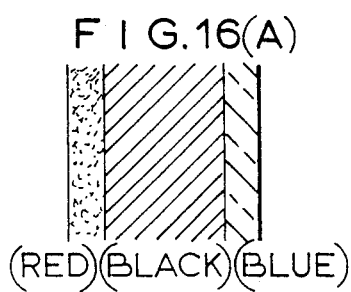
FIGS. 16(A) to 16(C) present diagrams illustrating examples of the color ghost image.
Figure 16B:
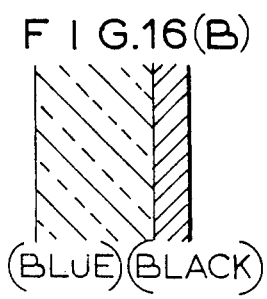
Figure 16C:
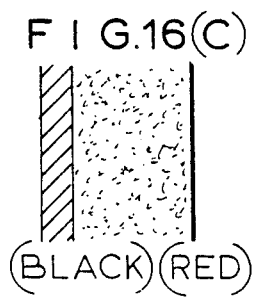

Let the case by considered, in which color ghosts in three colors are to be corrected by the method disclosed. FIGS. 10 show examples in which the color ghosts are generated in this case. This example is divided into three types, as shown in FIGS. 16(A) to 16(C), in all of which the center represents the intrinsic line width. Depending upon the method of color extraction or the magnitude of level fluctuations, the color ghosts may appear only at one side of the line or may not appear in the least (that is, they are generally reluctant to appear at the red edge). Generally speaking, however, the color ghosts always have a possibility of appearance (depending naturally on how to determine the binary threshold value). With preference to the black color, therefore, the color ghosts are left as they are in the cases of FIG. 16(B) and 16(C), but this method is accompanied by a drawback that the area of the black ghosts will increase. This situation is liable to occur especially in case the line width of the ghost color is merely equal to that of the intrinsic one.

According to this method, black and red table addresses are different. If the method is to be applied to three or more colors, the number of address lines required is $N \times M$ (wherein: letter N represents the number of colors., and letter M represents the number of peripheral pixels). For $N=4$ and $M=6$, for example, twenty four addresses, i.e., $2^{24}=16777216 \approx 16$ M (i.e., mega) addresses and memories of as high as total 67 M bits for the four color outputs are required. If the color number increases, moreover, the logical circuit becomes the more complicated. And, the method is practically impossible if one pixel is to be processed with the content of 6 to 8 bits.

According to the present invention, correction or removing of the color ghost is carried out with use of the color code. The correction of the color ghost is carried out by a simple processing circuit according to the present invention because of the color code.

In the method for the correction of the color ghost according to the present invention, first, colors of a noted pixel and pixels around the noted pixel are examined. Let's examine the appearances of the colors of a noted pixel of one dimension of $1 \times 7$ and peripheral three pixels by way of example.

When outputs of color information are obtained for a series of the seven pixels as follows as a result of scanning, the blue color of the noted (fourth) pixel is changed into black:

1 - White;
2 - White;
3 - Blue;
4 - Blue;
5 - Black;
6 - Black; and
7 - Black.

As a result, if the blue color at this time has data "18", for example, this data will change into "08" by the processing. This color pattern is exemplified shown in FIG. 19(A).

Figures 20, 21:
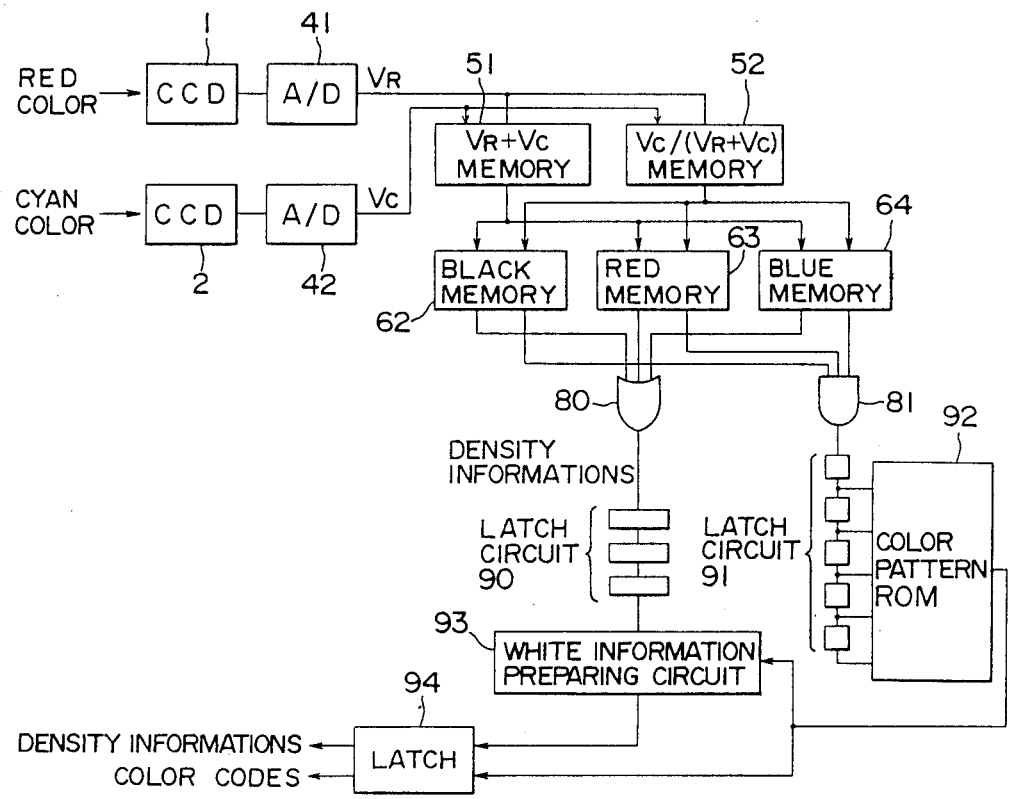
FIG. 20 presents a diagram tabulating the number of the color patterns.
FIG. 21 presents a block diagram illustrating one example of an image processing apparatus for achieving the method of the present invention.

Generally speaking, if N colors (including the white color) of an area consisting of M pixels are judged, $N^M$ color patterns are sufficient. For $N=2$ to 4 and $M=3$ to 9, for example, the color pattern numbers are given, as shown in FIG. 20. Since the ghosts appear for $N=3$ or more, the color ghosts are corrected if the color pattern numbers shown in FIG. 20 are prepared. The number M at this time is preferred to be the smaller but is usually sufficient at $M=5$ to 7. For the larger M value, the image of the more ghosts can be corrected. It is usually possible to correct the ghosts of one pixel for $M=5$ and the ghosts of two pixels for $M=7$. For $M=3$, on the contrary, the line may undesirably become thin when the ghosts are corrected. After the ghost correction, incidentally, the processing described above is required to set the density data at 0 for the pixels of which color code is changed from the color other than white to the white color. Incidentally, the color ghost correction can be performed in any directions including the main and auxiliary scanning directions.

(2) Multi valuation

The multi valuation is a process in which image signals having information to reproduce an image in continuous tone are converted into these having information to reproduce a stepped tone image, for example, two-valued (density=0 and 1) image, three-valued image.

FIG. 32 is a circuit diagram showing one example of the multi valuation circuit. The threshold ROM 82 is fed with the color codes, a level setting signal and the clocks CLK to output optimum threshold data according to the color codes and level setting signal inputted. The density informations and the threshold data are latched by a latch 104 and then are compared by a subsequent comparator 112 so that they are converted into binary data. Since the levels are set for the individual colors in the shown circuit, it is possible to set the density levels independently of the colors. Although the description made above is directed to the two-valuation, the circuit can be applied for the three- or four-valuation. In this application, the threshold ROMs the comparators and the latches are increased so that two or more threshold values may be compared.

(3) Size enlargement and reduction

Let's consider a method, for example, in which the interpolation of the image data is carried out in the main scanning direction whereas the scanning direction is carried out in the auxiliary scanning direction. If a magnification is expressed by p/q (wherein p and q are integers) in a one-dimensional lattice, the locations of an original lattice and a size-changed lattice are registered for every q original lattices(or for every p size-changed lattices). In other words, the one-dimensional lattice has a period of q. It is, therefore, sufficient to locate q or less point positions of the size-changed lattice thereby to determine the data from the point density of the original lattice around the size-changed lattice. FIG. 33 shows the positional relationships between the locations (as indicated at circle O) of the original lattice point and the locations (as indicated at letter X) of the size-changed lattice point for the magnification of 43.

In FIG. 34, letters J and K represent the positions of an original whereas $P_J$ and $P_K$ represent the density data (or informations) at those points, and the gradation is assumed to have 8 levels. As shown, the density data at the position (as indicated at X) of the size-changed lattice point are determined to 3 by the corresponding point on a straight line joining $P_J$ and $P_K$. In this way, a size change can be accomplished. As a matter of fact, the locations of the size-changed lattice point, the density data and so on can be retrieved at a high speed by adopting the table look-up type of the ROM.

FIG. 35 is a block diagram showing one example showing a size changing circuit. The density informations are latched by latches 121 and 122 in response to a clock CLKO and fed as addresses to an interpolation ROM 123. On the other hand, the size changing signal is fed to a ROM selector, which outputs two ROM select signals #1 and #2 in depending upon whether the magnification is larger (for enlargement) or smaller (for reduction) than 1. An enlargement position ROM 125 is selected in response to the signal #1 whereas a reduction position ROM 126 is selected in response to the signal #2.

On the contrary, clocks CLK1 are fed to a counter 127, which counts the number of the clocks CLK1 to feed its counted value as an address to the enlargement position ROM 125 and the reduction position ROM 126. And, these ROMs 125 and 126 output both the data of the counter 127 and the data latched in the address corresponding to the magnification signal to feed them to a latch 128. In response to the clocks CLK1, these data are latched by said latch 128. Then, the information concerning the position data is fed as an address from the latch 128 to the interpolation ROM 123, which outputs as interpolation data the data which are latched in the addresses corresponding to the outputs of the latches 121, 122 and 128. These interpolation data are inputted to and latched by a latch 129 in response to the clocks CLK1 until they are outputted to a binary circuit (although not shown).

(4) Making lines thinner or thicker and removal of isolated noises

The titled processings are not necessary for ordinary purposes but are used for intentionally making lines thicker or thinner or removing smudge from the surface of the original. The present processing may be accomplished by providing a special circuit but can be achieved by devising the color pattern using the color ghost processing circuit.

(4a) Removal of isolated noises

Usually, the line width of a writing tool is about 0.1 to 0.2 mm and takes 2 to 3 dots when the image is picked up at 16 dots/mm. As a result, it is conceivable that an isolated point of about 1 dot comes from noises due to the smudge. In case, therefore, a color pattern of 1×7, the center black pell corresponding to the following pattern may be treated as a white pell:

White-White-White-Black-White-White-White.

In this way, the isolated noise can be removed. In this case, it is apparent that the noise color should not be limited to the black.

(4b) Making lines thinner or thicker

In the case of thinning a line, for the following pattern:

White-White-White-Black-Black-White-White the line can be thinned by reducing the two black pixels to one, as follows:

White-White-White-Black-White-White-White.

In the case of making a line thick, on the contrary, for the following color pattern:

White-White-White-Black-Black-White-White the line can be thicked by increasing the two black pixels to three, as follows:

White-White-Black-Black-Black-White-White.

Although the description made above is directed to the case of the one-dimensional processing, but the present invention can be applied to a two-dimensional processing. In this modification, if the pattern is 3×3, for example, the line can be thinned by changing the black of the (center) pixel noted into white for the patterns shown in FIG. 36. For the patterns shown in FIG. 37, on the contrary, the line can be thicked by changing the black of the (center) pixel noted into black. Incidentally, these processing should not be limited to the dichoric patterns but can be extended to other colors.

(5) Image emphasis and MTF correction

The emphasis of an image is a technique to be used for emphasizing a line portion or a portion where density abruptly changes. If a filter of 1×3 of [−1, 3 −1] is applied in the main scanning direction, for example, only the edge in the main scanning direction is emphasized. If each density data is inputted as an address to the ROM which has latched an input information and made a convolution arithmetic of it in advance, the output of the ROM is an image-emphasized signal.

In a circuit shown in FIG. 38, an input signal is latched by latches 131 and 132 to prepare three different input signals $I_1$, $I_2$ and $I_3$, which are fed as addresses to a ROM 133. This ROM has made the following calculation in advance:

$I_1\times(-1)+I_2\times(3)+I_3\times(-1)$.

If, at this time, the density data of a point noted and the two sides are inputted as the addresses of that ROM, an image emphasis signal is outputted from the ROM 133.

Incidentally, if this filter of $1\times3$ is applied to the auxiliary scanning direction, the edge in this direction is apparently emphasized. Moreover, this emphasis can also be extended to a two-dimension. For example, an arithmetic of $3\times3$ may be conducted by using the following data:

$$\begin{bmatrix} 0 & -1 & 0 \\ -1 & 5 & -1 \\ 0 & -1 & 0 \end{bmatrix}.$$

On the other hand, generally speaking, the filter should not be limited to the above-specified one but can be varied in accordance with the using purpose.

This modification employs a circuit shown in FIG. 39. The input data are sequentially delayed by latches $L_{11}$ to $L_{32}$ and line memories $LM_1$ and $LM_2$ so that they are fed as addresses $3\times3$ to a ROM 140. A oombination of the informations of a noted pixel and pixels around the noted pixel is calculated and stored in advance in the ROM 140. In this state, the content of the ROM 140 is addressed to generate an output in accordance with the informations of the noted pixel and its periphery. FIG. 39 shows an example using the filter of $3\times3$. Generally speaking, however, it is quite natural that if a filter of $n\times n$ is used the numbers of the line memories and the latch circuits may be increased or decreased. On the other hand, the aforementioned one-dimensional filter can be applied first to the main scanning direction and then to the auxiliary scanning direction.

The example described above has employed the ROM, which may be an EpROM or EEpROM when in a low-speed operation and a bipolar ROM when in a high-speed operation. On the other hand, the same purpose can be achieved by using a RAM in place of the ROM, by feeding the RAM with data clculated in a CPU or data from a ROM and by addressing this RAM to produce an output. Moreover, a digital filter may be used for the purpose.

(6) Gradient change

Figure 40:
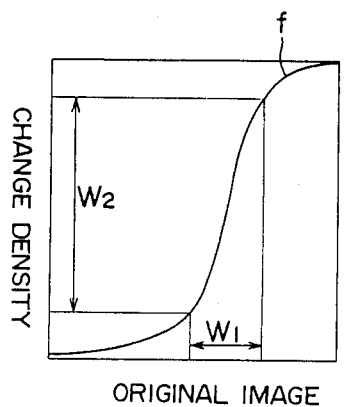
FIG. 40 presents a diagram illustrating the characteristics of gradation conversion.

Generally speaking, a variety of color originals are to be picked up into images, many of which have a narrow density range. The gradient change is intended when a clearer image is to be obtained from such images. FIG. 40 illustrates an example of gradient changing characteristics. In FIG. 40, the abscissa indicates the density of an original image, and the ordinate indicates the changed density. If the density range of the original image is designated at $W_1$ and if the gradation change is conducted with a curve f of FIG. 40, the image of which gradient is changed has a density range of $W_2$. Then, $W_2 > W_1$ so that an effect similar to the histogram equalization is obtained.

Figure 41:
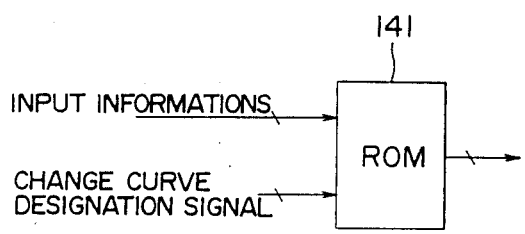
FIG. 41 presents a block diagram illustrating one example of a gradation converting circuit.

In order to realize this gradient change by means of a circuit, the look-up method of the ROM table may be adopted. Speciiically, the curve f (generally, a variety of curves are prepared and used by switching their shapes) is stored in a ROM 141, as shown in FIG. 41, and the density of an original image is inputted as an address to the ROM 141 so that a changed density value may be outputted. A desired curve may be selected from the change curves, as shown, by inputting a change curve designating signal.

A MTF correction can be carried out with a substantially same circuit as these shown in FIGS. 38 and 39. In the MTF correction, the filter coefficients are different from these for the image emphasis.

(7) Achromatizing

The achromatizing is a process for decoloring a part of an image to be reproduced. For examples, the achromatizing is conducted (1) for an areal part of the image and (2) for selected colored part of the image.

Figure 29:
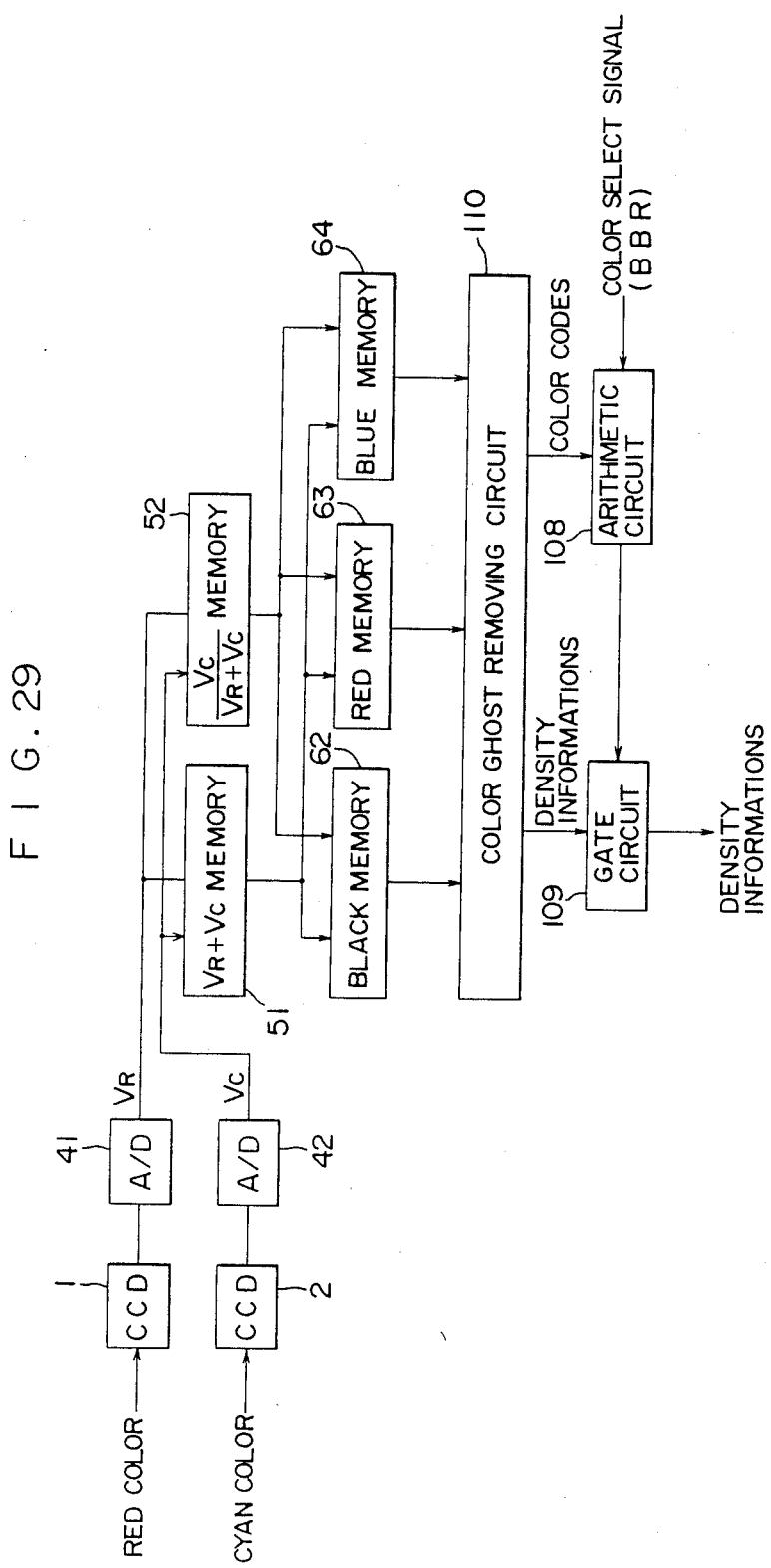
Figure 42:
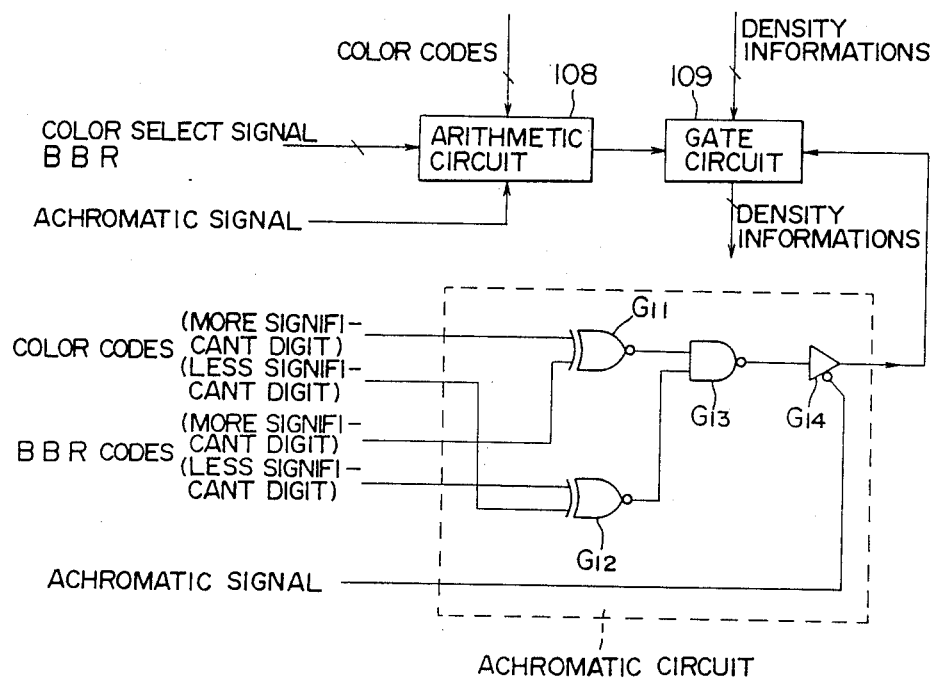
FIG. 42 presents a block diagram illustrating one example of an achromatic circuit.

In the circuit of the embodiment shown in FIG. 29, the gate circuit 109 may be opened or closed depending upon whether or not the operation is achromatic. A block defined by broken lines in FIG. 42 is an achromatic circuit, the output of which is fed to the gate circuit 109. The achromatic circuit is composed, as shown, of exclusive OR gates $G_{11}$ and $G_{12}$, a NAND gate $G_{13}$ and a 3-state buffer $G_{l4}$, the output of which is fed to the gate circuit 109.

When the achromatic signal is at "0" for the 3-state buffer $G_{14}$, the gate circuit 109 receives a "1" signal to output a density information. When the achromatic signal is at "1", on the contrary, the gate circuit 109 receives the "0" signal so that it is closed. Then, no density information is outputted to effect the achromatism. In case the ROM table is used, on the other hand, total six data of (three) erasures of one color and (three) erasures of two colors may be stored in the ROM to output the "1"/"0" signals in accordance with the color codes.

(8) Color change

Figures 43, 44, 45:
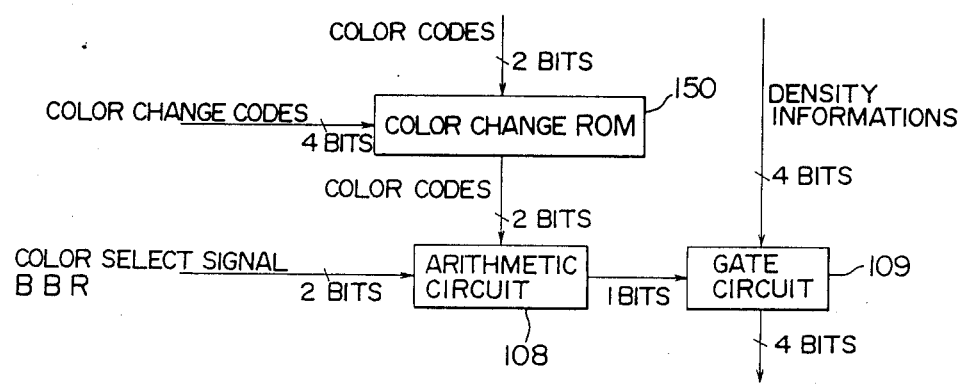
FIG. 43 presents a diagram tabulating color conversion codes.
FIG. 44 presents a diagram tabulating color conversion output codes.
FIG. 45 presents a block diagram illustrating one example of a color converting circuit.

In a system wherein input and output image signals have respectively information of three colors, there are 6-modes of color change for one color to one color-change and 3-modes of color change for two color to one color-change as shown in FIG. 43.

4 bits are sufficient for these nine patterns. For these color changes, there is used a ROM to which is inputted as an address a code prepared for a 4-bit input, as shown in FIG. 43. For the color change from red to black, for example, the ROM may change 2-bit color codes inputted into the output codes, as shown in FIG. 44.

FIG. 45 is a block diagram showing an example of the color changing circuit. Reference numeral 150 designates a color change ROM for eifecting the aforementioned color change, which outputs the new color codes shown in FIG. 44 when it receives the color codes (of 2 bits) and the color change codes (of 4 bits). These new color codes are fed to the arithmetic circuit 108. The subsequent operations are similar to those of FIG. 29.

Another color change system will be explanined hereinafter with reference to an embodiment shown in FIGS. 53 to 56. In this embodiment, "color change" includes a case wherein a selected color code in converted to a color code which designates white, so that images of the selected color or colors are erased.

Considering the case wherein the color change is couducted in red, blue and black colors, 15 different combinations are possible as shown in Table 1. The first bit (Right) and the second bit of the "access code" are the bits to represent the codes to be processed; the third bit is one to specify the two colors to be achromatized in the achromatizing mode; the fourth bit is one to indicate that, when said fourth bit is "1", two colors are to be changed into other one color at the time of color change; and the fifth bit is one for selecting the achromatizing and color change by specifying the color change when the bit is "1" and the achromatizing when the bit is "0". The case concerning the reversal of the black-and-white image is not listed in Table 1, but this can be accomplished by changing the color code after the color change.

TABLE 1

| Mode | Color to be converted | Color after conversion | Access code |
|---|---|---|---|
| Color extincting | Red | White | 00000 |
| | Blue | White | 00001 |
| | Black | White | 00010 |
| | Red + Blue | White | 00100 |
| | Red + Black | White | 00101 |
| | Blue + Black | White | 00110 |
| Color change | Red | Blue | 10000 |
| | Red | Black | 10001 |
| | Blue | Red | 10010 |
| | Blue | Black | 10011 |
| | Black | Red | 10100 |
| | Black | Blue | 10101 |
| | Red + Blue | Black | 11000 |
| | Red + Black | Blue | 11001 |
| | Blue + Black | Red | 11011 |

From the foregoing, it is reasonable to change the color code outputted from the memory for each picture element according to Table 1. To enable this, there is a circuit shown in FIG. 53. The color processing (achromatizing or color change) is executed in the processing circuit 543, and the image signal coupled with the optical density information in the circuit 544 is outputted to the recording unit. The time delay circuit is designed to delay the optical density information for the time required for the processing in the circuit 543.

Figure 55:
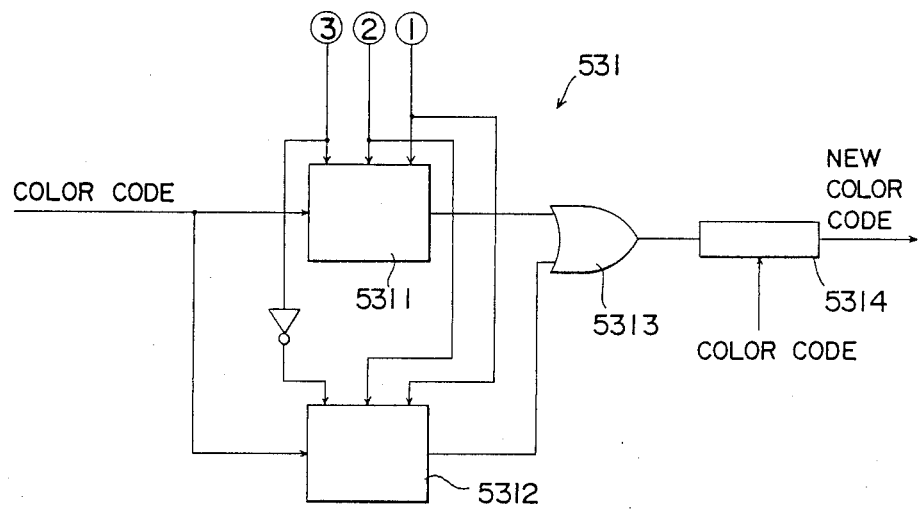
FIG. 55 is a more detailed block diagram of a circuit for decoloring.
Figure 57:
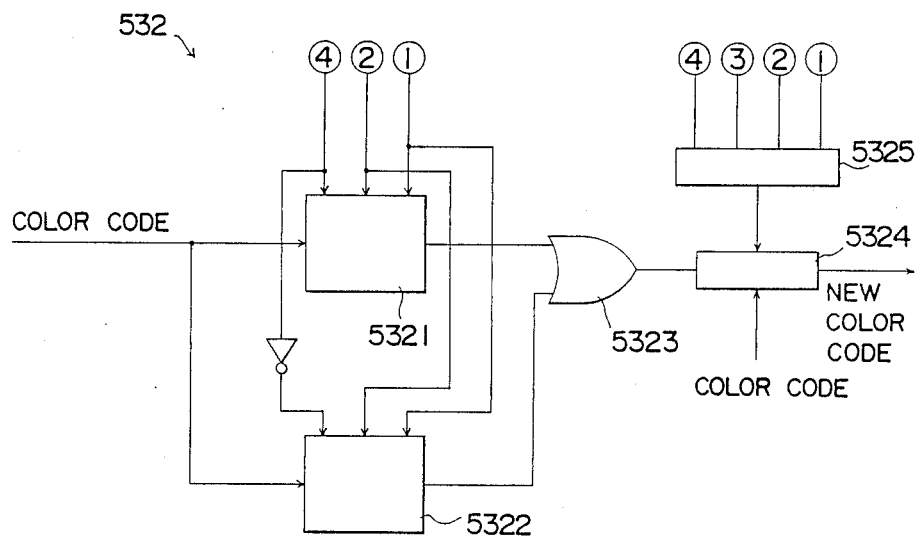
FIG. 57 is a more detailed block diagram oi a circuit for color change.
Figure 56A:
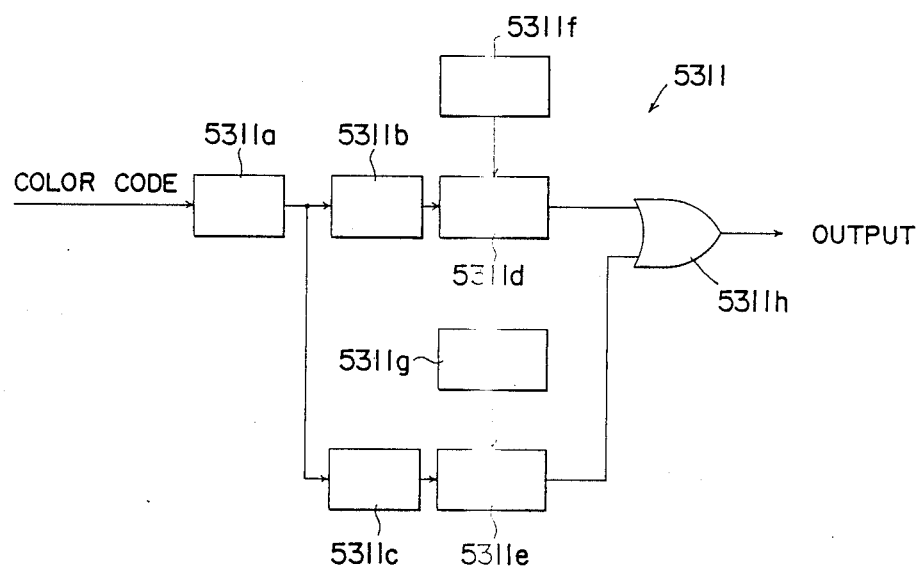
FIGS. 56(A) and 56(B) are block diagrams of a circuit for detecting 2 colors.
Figure 56B:
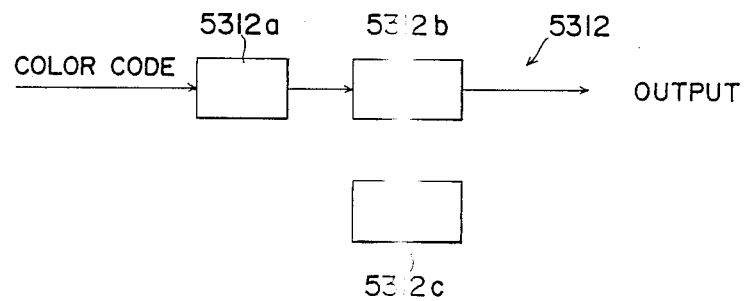

FIG. 54 shows the content of the color processing circuit 543 (see FIG. 53) consisting of the achromatizing circuit 531, color change circuit 532 and OR-gate 533. FIG. 55 shows the content of the achromatizing circuit 531 consisting of the 2-color detection circuit 5313, 1-color detection circuit 5312, OR-gate 5313 and color code conversion circuit 5314. The 2-color detection circuit 5311 is composed as shown in FIG. 56(a), and the 1-color detection circuit 5312 as shown in FIG. 56(b). The 2-color detection circuit 5311 consists of the latches 5311a through 5311c, coincidence detection circuit 5311d and 5311e, color code set output units 5311f and 5311g and OR-gate 5311h. The 1-color detection circuit 5312 consists of the latch 5312a, coincidence detection circuit 5312b and color code set output unit 5312c. FIG. 57 shows the detail of the color change circuit 532 consisting of the 2-color detection circuits 5321 and 5322, OR-gate 5323, color code change circuit 5324 and code set unit 5323. Said 2-color detection circuit 5321 and said 1-color detection circuit consist of the circuits similar to those shown in FIG. 56 respectively.

Concerning the achromatizing circuit 531 or the color change circuit 532 shown in FIGS. 53 through 57, when the value of the fifth bit (5) is "1", the achromatizing circuit 531 is selected, whereas the color change circuit 532 is selected to become active when the said value is "0", and the output color code on the side which has not been selected becomes "11" (white). When the color change circuit 532 is selected, and the value of the fourth bit (4) is "1", the mode of the color change circuit 532 is set for converting two colors into other one color to make active the 2-color detection circuit 5321 (see FIG. 57); the conversion specification color codes for the two colors by the first and the second bits (1) and (2) are set in order in the internal color code output units 5311f and 5311g (see FIG. 56(a)); when the color codes to be inputted are detected in the coincidence detection circuits 5311d and 5311e, "1" is outputted, and the color code to determine the color into which the color is to be converted and which has already been set by 4 bits is outputted from the color code conversion circuit 5324 shown in FIG. 57. In other case, however, the color code to be inputted is outputted as it is.

When the value of the fourth bit (4) is "0", the mode is set for the conversion of one color to cause the 1-color detection circuit 5322 shown in FIG. 57 to become active; the color code for one color by first and the second bits (1) and (2) is set in the internal color code output unit 5312c shown in FIG. 56(b); when the color code to be inputted is detected in the coincidence detection circuit 5312b, "1" is outputted, and the previously set color code to determine the color into which the color is to be converted is outputted from the color code conversion circuit 5324. In other case, however, the input color code is outputted as it is.

When the achromatizing circuit 531 is selected, and the third bit (3) is "1", the achromatizing circuit is set to the mode for erasing two colors to make active the 2-color detection circuit 5311 shown in FIG. 55; when the aohromatizing specifying color codes for two colors by the first and the second bits (1) and (2) are set in order in the internal color code output units 5311f and 5311g shown in FIG. 56(a), and the color code to be inputted is detected in the coincidence detection circuits 5311d and 5311e, "1" is outputted, and the color code 11 for white color is outputted from the color code conversion circuit 5314. In other case, however, the input color code is outputted as it is. When the third bit is "0", the mode is set for achromatizing one color to make active the 1-color detection circuit 5312 shown in FIG. 55; when the achromatizing specifying color code for one color by the first and the second bits (1) and (2) is set in the internal color code output unit 5312c, and the color code to be inputted is detected in the coincidence detection circuit 5312b, "1" is outputted, and the color code 11 for white color is outputted from the color code conversion circuit 5314 shown in FIG. 55. In other case, however, the input color code is outputted as it is.

In the cases described above, the color code conversion circuit 5314 shown FIG. 55 or the color code conversion circuit 5324 shown in FIG. 57 can be used either for the look-up table using the ROM or for the table previously set using the RAM. The gate can also be used together with these circuits.

FIG. 21 is a block diagram showing one example of an image processing apparatus for implementing the method of the present invention. The same components as those of FIG. 8 are designated at the same reference numbers. The circuit, as shown, corrects the color ghosts in the main scanning direction but can be applied likewise to the auxiliary scanning direction if line memory are used. Here, it is assumed that the colors be four (i.e., N=4), i.e., white, red, blue and black colors and that the color patterns be 1×5 (i.e., M=5). By the operations similar to those described with reference to FIG. 8, the black memory 62, the red memory 63 and the blue memory 64 are stored with the image data (i.e., the color-extracted data).

If one address is designated for those color extraction memories 62 to 64, the image data are outputted. Then, for example, the color codes of more significant 2 bits and the density data of less signiiicant 4 bits of the image data outputted from the individual memories are stored in latch circuits 90 and 91, respectively. Then, the output of the latch circuit 91 enters a color pattern ROM 92 whereas the output of the latch circuit 90 enters a white information preparing circuit 93. Of these outputs, the density data are stored in the latch circuit 90 through an OR gate 80, and the color codes are stored in the latch circuit 91 through a gate 81.

If the following data are inputted as the address of the color pattern ROM 92, for example:

White - White - Red - Black - Black, then the ROM address is expressed as follows and is coded at 3EO in a hexadecimal notation:

| 11 | 11 | 10 | 00 | 00 |
|---|---|---|---|---|
| (White) | (White) | (Red) | (Black) | (Black). |

The address coded at 3EO stores a code representing the black color, i.e., the data 0 so that the data (0, 0) are outputted from the color pattern ROM 92. The density information latched by the latch circuit 90 is subjected to a predetermined processing by the subsequent white information preparing circuit 93 until it is latched by the latch circuit 94. And, the density data latched by the latch circuit 90 and the color code outputted from the color pattern ROM 92 are synchronously outputted.

Thus, the color code is corrected to eliminate the color ghosts. At this time, the output of the white information preparing circuit 93 is controlled with the output of the color pattern ROM 92. For example. The color code (1, 1), i.e., the density data of the white data is reduced to 0 whereas the data of other colors are outputted as they are. In the correction of the color ghost, the color patterns are corrected so that black color is stressed, because many originals usually have black patterns on the white blank.

Although the description thus far made takes up the one-dimensional color pattern as an example, the present invention should not be limited thereto but can use a two-dimensional color pattern (which has a size of 3×3, for example). In this case, the hatched region, as shown in FIG. 22, presents a notable pixel. In the color ghost processing, generally speaking, the ghosts may have a width of about 2 pells to make it necessary to consider the colors of 2 pells at the two sides of the pixel noted. In other words, the size required is as large as five pixels. This requirement makes it easy to use the one-dimensional color pattern. In the two-dimensional case, the number of pixels is 3×3=9 even for the size of 3×3, and the color patterns required are 262,144, as shown in FIG. 20. As a result, the pattern number is drastically increased, as compared with the one-dimensional one, but the color information around the noted pixel is hard to introduce.

Incidentally, the color pattern may be either one-dimensional as 1×7 (in which the scanning operations need be in the main and auxiliary directions, as shown in FIG. 23) or two-dimensional as 3×3 (in which the color pattern may be moved in one direction, e.g., in the main scanning direction). FIG. 19(B) shows an example of the output color codes in the case of the color pattern of 1×7.

The foregoing description takes up the case in which the color pattern method is used as the color ghost correcting method, but the present invention should not be limited thereto but may use any method if the method can remove the color ghosts.

As has been described in detail hereinbefore, it is possible to realize an image processing method and an apparatus therefor, which are enabled to ensure removal of the color ghosts with the simple construction by the ghost correction process according to the present invention wherein color codes are uniquely used.

(1) In the prior art, only the density data are outputted for the color extraction. In the method of the present invention, on the contrary, color designating color codes (i.e., color designating informations) are added for the color extraction to the more or less significant digits of the density data.

(2) The color processing such as the color ghost processing is based on the color codes.

(3) The image data processing is based on the density informations.

Figure 24:
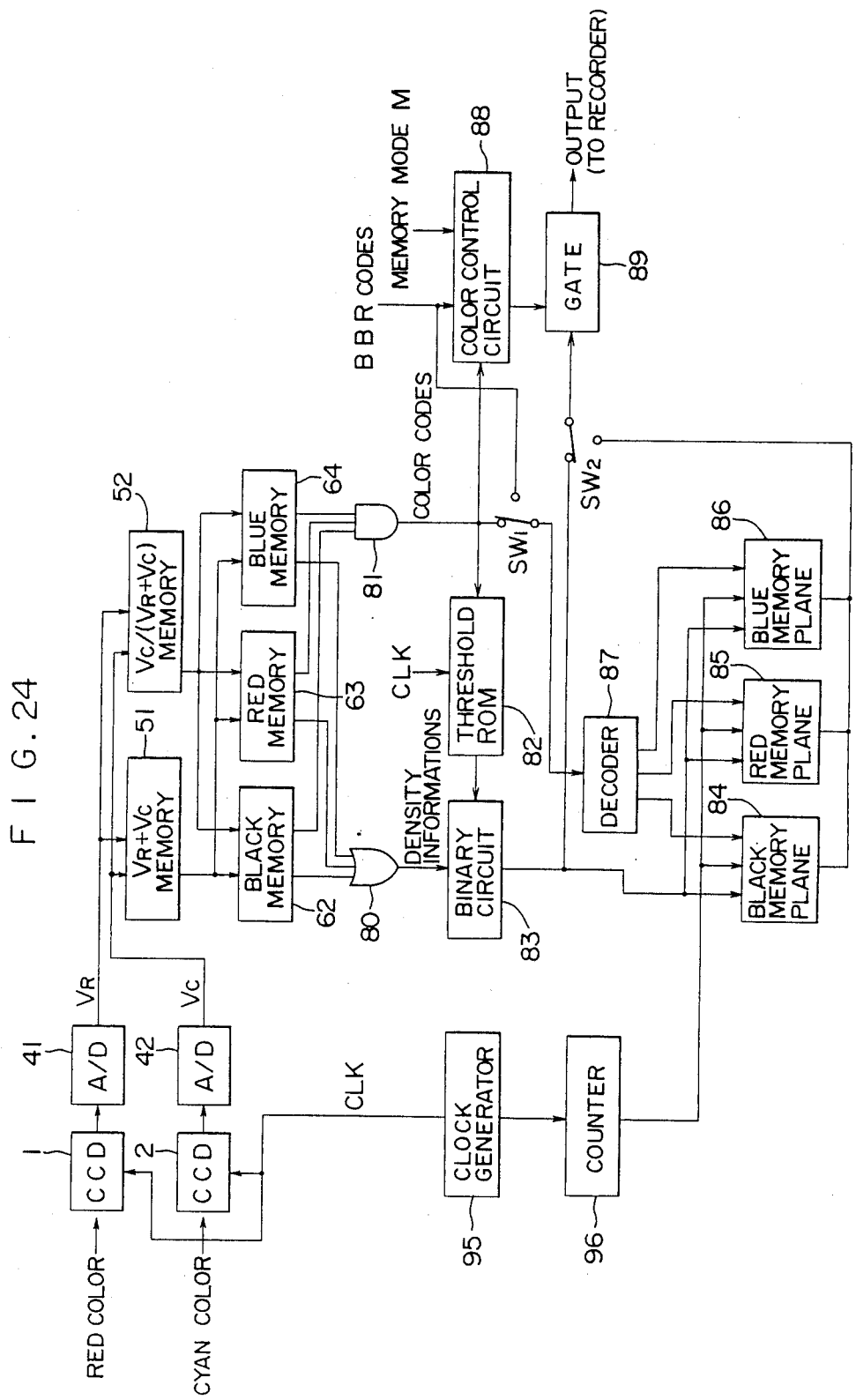
FIG. 24 presents a block diagram illustrating one embodiment of the apparatus of the present invention.

FIG. 24 is a block diagram showing the structure of another embodiment of the present invention, especially its binary circuit. In FIG. 24, the same components as those of FIG. 21 are designated at the same reference numerals.

Reference numeral 83 designates a binary circuit for coding the density informations from the OR gate 80 in a binary notation on the basis of the threshold data from a threshold ROM 82. Numeral 84 designates a black memory plane for storing the data of the black color of the binary data coming from the binary circuit 83. Numeral 85 designates a red memory plane for storing the data of the red color of the same, and numeral 86 designates a blue memory plane for storing the data of the blue color of the same.

Numeral 87 designates a decoder for decoding the color codes or the B.B.R. codes (for the B.B.R. signal) coming from the gate 81 through a switch SW1 to generate a select signal for selecting the individual memory planes 84 to 86. Numeral 88 designates a color control circuit having input terminals of the B.B.R. codes, the memory mode signal M and the color code signal. Numeral 89 designates a gate controlled by said color control circuit 88. The gate 89 receives either the output of the binary circuit 83 or any output of the memory planes 84 to 86 through a switch SW2 and sends its output as the output of the shown whole circuit to a recording device (e.g., a printer). Numeral 95 designates a clock generator for generating clock pulses and sending them as shift clocks to the CCDs 1 and 2 and as address clocks to the threshold ROM 82. Numeral 96 designates a counter for counting the output clocks of the clock generator 95 to feed the memory planes 84 to 86 with its output as addresses indicating the positional information. The operations of the circuit thus constructed will be described in the following.

The red and blue optical images having their colors separated by a color separating optical system (although not shown) are photoelectrically converted for each of their pixels by the CCDs 1 and 2 and are then converted normalized digital data by the A/D converters 41 and 42. This normalization can be realized by making such a full-scale adjustment that the output when the reflected light of a white density plate is incident may take a full-scale value. The outputs $V_R$ and $V_C$ of the A/D converters 41 and 42 are fed as addresses to the $(V_R+V_C)$ memory 51 and the $V_C/(V_R+V_C)$ memory 52, respectively. And, the luminance signal data ($V_R+V_C$) corresponding to the input address are outputted from the ($V_R+V_C$) memory 51, whereas the color difference signal data $V_C/(V_R+V_C)$ corresponding to the input address are outputted from the $V_C/(V_R+V_C)$ memory 52. Both of these data are inputted commonly as addresses to the color extraction memories 62 to 64.

From the black memory 62, the red memory 63 and the blue memory 64, there are outputted image data which correspond to the input address and contain the color designating informations and the density informations, as has been described hereinbefore. Density informations outputted from the OR gate 80 enter the binary circuit 83. This addition at the OR gate 80 raises no difficulty, because the individual color extraction memories 62 to 64 have such internal contents that all the data in the regions corresponding to other colors are at 0, shown in FIGS. 18. On the other hand, the color designating informations enter the gate 81 and are outputted as the color codes from said gate 81.

The color codes thus outputted from the gate 81 enter the ROM 82 to select a binary threshold value. Now, let it be assumed that the color codes (00), (01) and (10) represent the black, blue and red colors, respectively. And, the dither matrices of $2 \times 2$ shown in FIG. 25 are used for the individual colors. The output (threshold) values of the dither matrices shown in FIG. 25 are determined, as shown in FIG. 25, for the input clocks CLK and the color codes. As a result, the threshold values are outputted from the threshold ROM 82 for the individual color codes sequentially in synchronism with the clocks CLK.

The threshold data thus outputted enter the binary circuit 83 in which they are compared with the density informations inputted separately. Binary data based on the compared result are outputted from the binary circuit 83. On the other hand, the color codes selected by the switch SW1 are decoded by the decoder 87 so that the memory planes of the individual colors are selected in accordance with said decoder output. Moreover, the position of each pixel can be located by counting the output clocks of the clock generator 95. The counter 96 gives the positional information of each pixel as the address to each of the memory planes 84 to 86. The output (i.e., the binary data) of the binary circuit 83 is stored at the address thus designated.

According to the foregoing embodiment of the present invention, the operations described above can be made by the single image pickup action. On the other hand, only one color can be selectively outputted by arithmetically operating the B.B.R. codes and the color codes. By switching the switches SW1 and SW2, moreover, the individual color informations stored in the memory planes 84, 85 and 86 can be outputted one by one by the B.B.R. codes. This operation is controlled by the memory mode selection signal M is used.

In this operation, the color control circuit 88 outputs the signals shown in FIGS. 27 in response to the B.B.R. codes, the color codes and the memory mode selection signal M. The gate 89 is opened for the output at "1". In the case (M=1) of the memory mode other than that shown in FIG. 27(A), the gate 89 is opened only when the B.B.R. codes and the color codes are coincindent. In the case (M=1) of the memory mode, the gate is open at all times. In the memory mode, therefore, the information of the memory plane designated by the B.B.R. codes is outputted. As has been described hereinbefore, according to the present invention, the image informations are composed of the color designating informations and the density informations, and the threshold value for coding the density informations in the multi valuation is selected by the use of those color designating informations. This makes it possible to store the image informations by the single pickup action at a lower price and with a simpler circuit structure than the method of the prior art. In the embodiment thus far described, the colors are limited to the three, i.e., the black, red and blue colors, to which the present invention should not be limited. Neither should the multi valuation be limited to the system which generates two-valued output disclosed in the embodiment, but present invention can make systems which generate multi-valued output, such as three or four-valued output. The present embodiment employs the dither matrix of $2 \times 2$, but the present invention should not be limited thereto. Furthermore, the threshold ROM is selected with the color codes, but it is apparent that the selection of the threshold ROM can be accomplished by the color control circuit. Furthermore, the three black, red and blue memories are used to store the data shown in FIG. 18, but similar results can be obtained by the use of a single memory.

On the other hand, generally speaking, the phenomenon called the color ghosts appears in case the color original is to be picked up by employing a plurality of pickup elements. In this case, the color ghosts can be removed by processing the color designating informations. This makes it possible to conduct the color ghost removal after the color extraction and then to store the informations of plural colors by the single image pickup action using the circuit example shown in FIG. 24. As another application of the present invention, a variety of image processings can also be conducted on the density informations before the multiple-valued notation.

As has been described in detail hereinbefore, according to the aforementioned embodiment of the present invention, an image processing system of a simple construction, which is enabled to conduct the multiple-valued notation for each color on real time by a common circuit, can be realized by using the density informations and the color designating informations as the color extracting image data. In the present invention, moreover, for the simplest example, the color extraction ROM is exemplified by the plural memories. It is, however, apparent that the circuit can be realized by a single ROM if the color codes are used.

Figure 28:
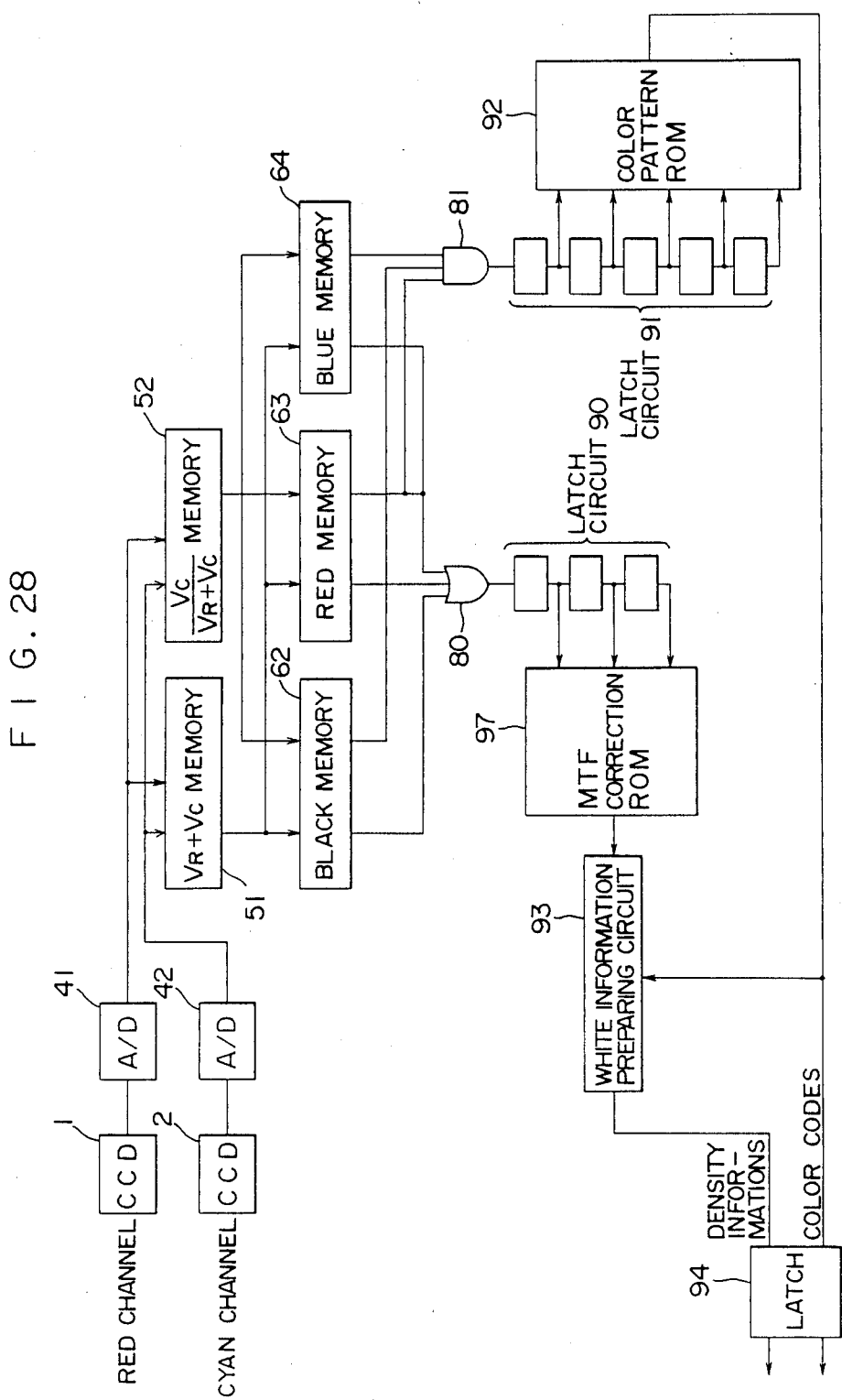
FIGS. 28 and 29 present block diagrams illustrating other embodiments of the present invention, respectively.

FIG. 28 is a block diagram showing a further embodiment of the present invention. The same components as those of FIG. 21 are designated at the same reference numerals. Of the data stored by the individual color extraction memories 62 to 64, the color designating informations are sent through the gate 81 to the latch circuit 91. This latch circuit 91 is constructed of latches of 5 bits, the outputs of which are inputted as addresses to the color pattern ROM 92. Of the data stored in the color extraction memories 62 to 64, on the other hand, the density informations are sent through the OR gate 80 to the latch circuit 90. The outputs of this latch circuit 90 are fed to an MTF correction ROM 97, the output of which is fed to the white information preparing circuit 93. This white information preparing circuit 93 is fed with not only the output of the MTF correction ROM 97 but also the output of the color pattern ROM 92. And, the output of said white information preparing circuit 93 is fed as the density informations to the latch 94. The operations of the apparatus thus constructed will be described in the following.

The latch circuit 90 is caused to latch the density informations by the action similar to that of FIG. 21. The density informations thus latched are inputted as addresses to the subsequent MTF correction ROM 97. This MTF correction ROM 07 outputs the MTF corrected data. Here, the MTF correction is one for improving the resolution. For the higher spatial frequency, generally speaking, the output amplitude of a CCD drops to change the apparent density. This disadvantage is corrected by the MTF correction. For example, the state of a pixel noted is discriminated from the states of the pixels around the noted one to make a correction in a direction to enhance the resolution.

Thus, the white information preparing circuit 93 receives the MTF corrected data. On the other hand, the color pattern ROM 92 receives the color codes of 5 bits of the noted pixel and its peripheral pixels to output the corrected color codes for removing the color ghosts. These color codes are inputted to the latch 94 and to the white information preparing circuit 93. And, this white information preparing circuit 93 sets all the outputs of the MTF correction ROM 97 at 0, when the color codes are (1, 1) representing the white color. In other color codes, the output of the MTF correction ROM 97 is sent as it is as the density informations to the latch 94. The density informations and color codes thus latched by the latch 94 are outputted in synchronism with each other.

In the shown circuit, the color ghost processing and the MTF correction processing are conducted in parallel. For these parallel processings, the not shown timing control circuit controls the read timings of the color pattern ROM 92 and the MTF correction ROM 97. For the MTF correction, the one-dimensional processing is not popular, as in the present embodiment, but two-dimensional processing is preferable for a higher image quality. In this latter case, it is quite natural that the MTF correction can be made two-dimensionally by the use of a line memory. In the present embodiment, on the other hand, the correction is made by the use of the ROM, but the present invention may be modified such that the image is picked up by calculating the quantity of correction with a CPU in advance by the use of the ROM and by writing the calculated data in a RAM. It is also apparent that a digital filter or the like can be used.

The description thus far made is directed, by way of example, to the case in which the MTF correction is conducted as the image processing to be conducted in parallel with the color ghost processing. However, the present invention should not be limited to that case, but the MTF correction may be replaced by the image emphasis or gradation changing processing.

As has been described in detail hereinbefore, according to the aforementioned embodiment of the present invention, the color ghosts can be prevented without fail from appearing by conducting the color ghost processing in parallel with the processing of the image informations after the color extraction. According to the present invention, moreover, the table addresses for the color separation are common among the individual colors so that a simple apparatus can be realized.

FIG. 29 is a block diagram showing the structure of a further embodiment of the present invention. The same components as those of FIG. 21 are designated at the same reference numerals. In FIG. 29, reference numeral 110 designates a color ghost removing circuit for removing the color ghosts in response to the outputs of the color extraction memories 62 to 64. Numeral 108 designates an arithmetic circuit for performing an arithmetic operation in response to the color codes of said color ghost removing circuit 110 and the color select signal B.B.R. Numeral 109 designates a gate circuit for gating and outputting the density information output of the color ghost removing circuit 110 in response to the output of the arithmetic circuit 108.

The black memory 62, the red memory 63 and the blue memory 64 output image data corresponding to the input addresses and feed them to the color ghost removing circuit 110. This color ghost removing circuit 110 conducts the color ghost removal by the color pattern method, which has been described with reference to FIG. 21, to output the density informations and the color codes corresponding to the former. The arithmetic circuit 108 outputs the "1" level, only when the color codes and the color select signal B.B.R. are coincident, and otherwise the "0" level. As a result, the gate circuit 109 is opened to pass the density informations therethrough, only when the output of the arithmetic circuit 108 is at "1", and is closed when the same output is at "0".

FIG. 30 is a diagram showing one example of the construction of the arithmetic circuit 108. Both the color codes and the color select signals B.B.R. (which will be called the "B.B.R. codes") are individually composed of 2 bits. The color codes and the B.B.R. codes have their more significant bits fed to a first exclusive OR gate $G_1$ and their less significant bits fed to a second exclusive OR gate $G_2$. And, both the outputs of those first and second exclusive OR gates $G_1$ and $G_2$ are fed to an AND gate $G_3$, the output of which is inputted to the gate circuit 109. Only when both the color codes and the B.B.R. codes are equal, the outputs of the exclusive OR gates $G_1$ and $G_2$ take the level "1" so that the AND gate $G_3$ produces its output "1". In other cases, either the gate $G_1$ or $G_2$ takes the level "0" so that the output of the gate $G_3$ takes the level "0" to close the gate circuit 109. FIG. 31 is a diagram tabulating the outputs of the arithmetic circuit shown in FIG. 30.

FIG. 46 is a block diagram showing the structure of a further embodiment of the present invention and an image processing system including a color ghost processing circuit. The same components as those of FIG. 28 are designated at the same reference numerals. A block enclosed by broken lines in FIG. 46 is the color ghost removing circuit which is composed of the gates 80 and 81, the latches 90 and 91, the color pattern ROM 92 and the white information preparing circuit 93. Of the outputs of the color extraction memories 62 to 64, all the density informations are fed to the gate 80, the output of which is fed to the first latch circuit 90, the output of which in turn is fed to the white information preparing circuit 93.

On the other hand, all the color designation informations are fed to the gate 81, the output of which is fed to the second latch circuit 91, the output of which in turn is fed to the color pattern ROM 92. The second latch circuit 91 employs a plurality of stages of shift registers, for example, so as to attain the color informations of a noted pixel and pixels around the noted pixel. The output of the color pattern ROM 92 is fed to the white information preparing circuit 93 and the latch 94, whereas the output of the white information preparing circuit 93 is fed to the latch 94.

According to the outstanding embodiment of the present invention, it is possible to realize an image processing system which is enabled to remove the ghosts without failure by giving one pixel information in the color designating color codes and the density informations and by converting the color designating data after the color extraction by the use of those color codes.

Figure 47:
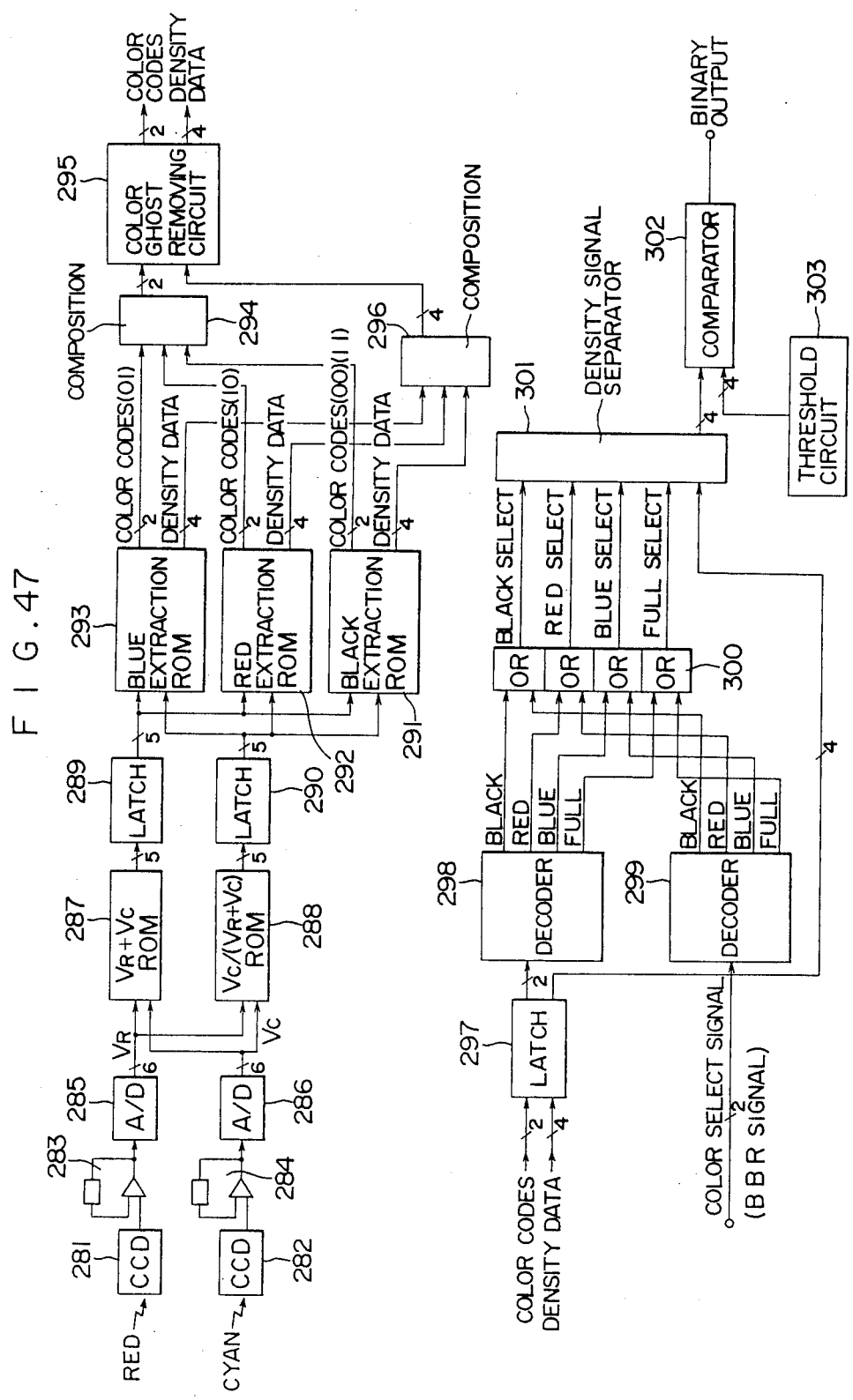

FIG. 47 is a block diagram showing the structure of a further embodiment of the present invention. Numerals attached to the signal lines, as shown, represent the bit numbers of the signals. The optical images having their colors separated into red and cyan colors by a color separating optical system (although not shown) are photoelectrically converted by CCDs 281 and 282, respectively, and the resultant electric signals are amplified to predetermined levels by subsequent amplifiers 283 and 284. The image signals thus amplified are converted into digital data by A/D converters 285 and 286, respectively. These A/D converters 285 and 286 are so subjected to a full-scale adjustment in advance that they may take rated outputs when they receive the image pickup signal of a white reference density plate. As a result, the data $V_R$ and $V_C$ outputted from the A/D converters 285 and 286 are normalized.

These data $V_R$ and $V_C$ are commonly inputted as addresses to a ($V_R+V_C$) ROM 287 for storing luminance signal data and a $V_C/(V_R+V_C)$ ROM 288 for storing color difference signal data. The ($V_R+V_C$) data and $V_C/(V_R+V_C)$ data corresponding to the input addresses are outputted from the ($V_R+V_C$) ROM 287 and the $V_C/(V_R+V_C)$ latches 289 and 290, respectively. The data thus latched by the latches 289 and 290 are commonly inputted as addresses to a black extraction ROM 291, a red extraction ROM 292 and a blue extraction ROM 293. In the description thus far made: the CCD 281 and CCD 282 correspond to the CCD 1 and CCD 2 of FIG. 8; the amplifiers 283 and 284 to the amplifiers 231 and 232; the A/D converts 285 and 286 to the A/D converters 241 and 242; the ($V_R+V_C$) ROM 287 to the ($V_R+V_C$) memory 251; the $V_C/(V_R+V_C)$ ROM 288 to the $V_C/(V_R+V_C)$ memory 252, the black extraction ROM 291 to the black memory 262, the red extraction ROM 292 to the red memory 263; and the blue extraction ROM 293 to the blue memory 264.

The black extraction ROM 291, the red extraction ROM 292 and the blue extraction ROM 293 extract the color extraction map described with reference to FIG. 6 into a black (or achromatic) region, a red region and a blue region, respectively, to store the density data (corresponding to the densities) independently for the individual color ranges. In the present invention, moreover, the aforementioned color designating color codes are stored in addition to the density data for each pixel in a manner to couple with the density data. These ROMs 291 to 293 are stored with dummy data (at 0) in their addresses other than those assigned to themselves. When the ($V_R+V_C$) data and the $V_C/(V_R+V_C)$ data outputted from the latches 289 and 290 are commonly inputted as addresses to those color extraction ROMs 291 to 293, the image data stored in the addresses specified by said addresses are outputted. The color extraction ROMs 291 to 293 output individual image data corresponding to the input addresses, but only one of the three outputs has a meaning. Incidentally, these luminance signal data ROM, the color difference signal data ROM and the color extraction ROM may be constructed of a single ROM.

The image data thus outputted from the individual color extraction ROMs 291 to 293 are separated into the color designating color codes and the density data, which are then processed separately. The color codes are fed through a first composer 294 to a color ghost removing circuit 295, whereas the density data are fed through a second composer 296 to the color ghost removing circuit 295. In response to the color codes and the density data, the color ghost removing circuit 295 conducts such ghost removing operations (as will be described in detail in the following) in both the main and auxiliary scanning directions as will convert the color codes or ghosts into color codes (i.e., color codes matching the color of the circumstance) in another color, and outputs the color codes and density data, from which the ghosts are removed.

The color codes and density data thus outputted from the color ghost removing circuit 295 are latched by a latch 297. Of the data thus latched, the color codes are fed to a first decoder 298 so that they are decoded into four color designating signals of black, red, blue and white. On the other hand, a color select signal (i.e., B.B.R. signal) given separately is fed to a second decoder 299 and is demodulated into four color designating signals of black, red, blue and white. Of these color designating signals, the signal couples in the same colors are fed to individual OR gates 300 so that they are outputted therefrom as a black select signal, a red select signal, a blue select signal and a white select signal, respectively.

The select signals thus outputted from the OR gates 300 in these signals are fed to a density signal separator 301. In the meanwhile, the density data latched by the latch 297 have already been fed to said density signal separator 301. In response to these signals, the density signal separator 301 selective output the density data in the individual colors (as will be described in detail in the following). And, the density data thus outputted from the density signal separator 301 are compared in a comparator 302 with a threshold value outputted from a threshold circuit 303 so that they are converted into binary data. These binary data are outputted as the image data. Incidentally, the multiple-valued output should not be limited to the two-valued output but can be extended to the three- or four-valued.

Figure 48:
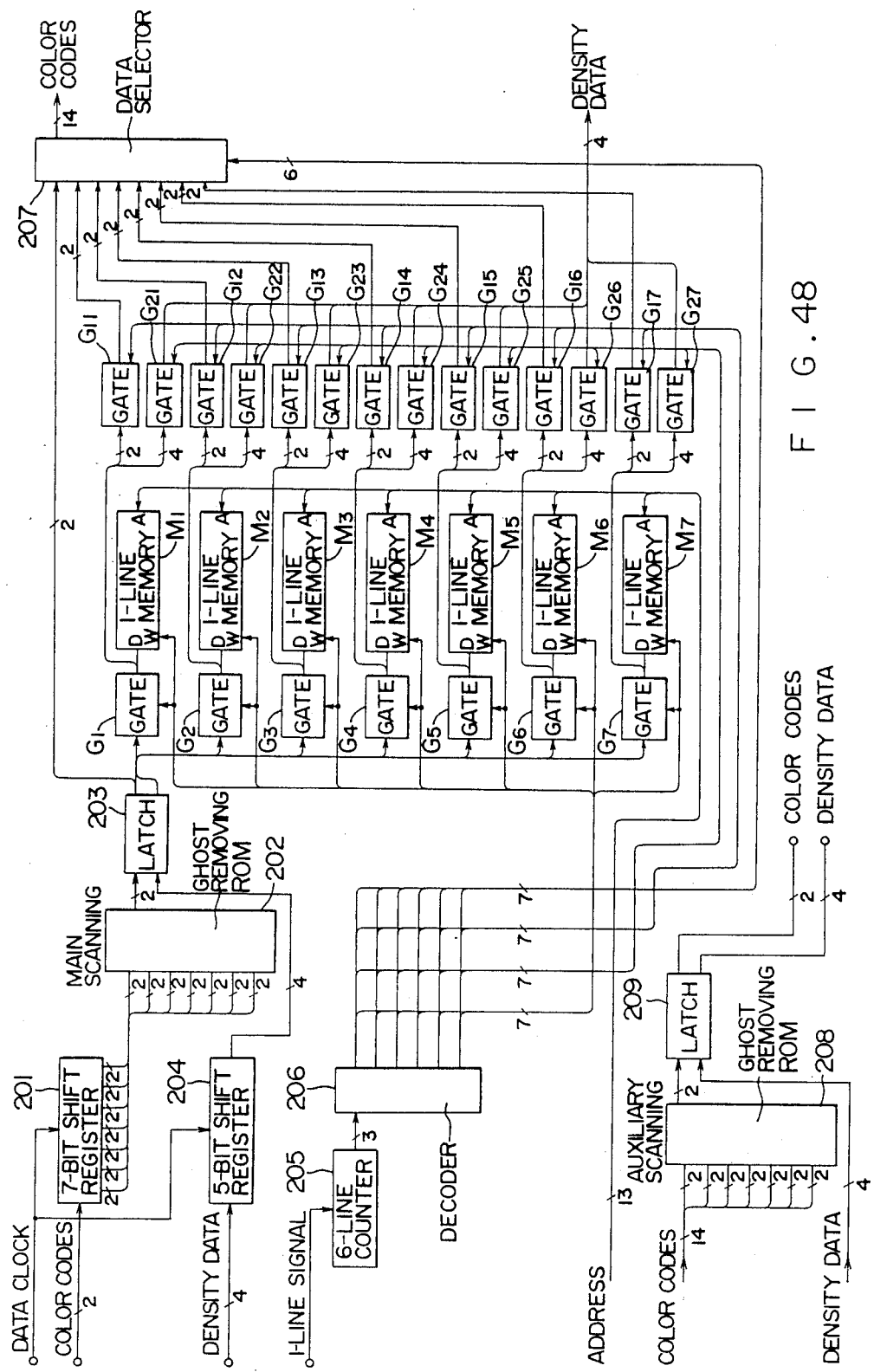
FIG. 48 presents a block diagram illustrating an example of the detailed structure of a color ghost removing circuit.

FIG. 48 is a circuit diagram showing an example of the detailed structure of the color ghost removing circuit 295. The circuit, as shown, is enabled to conduct the color ghost removal in both the main and auxiliary scanning directions. The color codes (of 2 bits) are fed to a first shift register 201 so that they are shifted in response to a data clock. The shift register 201 outputs parallel data of 2×7 bits which are delayed by 7 bits at the maximum from the color codes of 2 bits. These parallel data are fed to a ghost removing ROM 202 for removing the ghosts in the main scanning direction. This ghost removing ROM 202 conducts the ghost removal by the aforementioned color pattern method.

Specifically, for the color patterns of 1×7, the color codes of a noted center pixel are converted from the color of the noted pixel and the colors of three pixels before and after the noted pixel into the color codes freed from the color ghosts. The color codes thus having their ghosts removed in the main scanning direction are latched by a latch 203. The density data (of 4 bits) are fed to a second shift register 204 of 5 bits and converted thereby into density data of the noted pixel in response to a data clock until they are latched by the latch 203.

On the other hand, 1-line signals outputted separately are counted by a 7-line counter 205, from which is outputted a signal specifying a later-described 1-line memory. The output (of 3 bits) of the 7-line counter 205 is decoded by a decoder 206. Of the signals (which will be called the "memory select signals") outputted from the decoder 206 for selecting six 1-line memories, one group are inputted to gates $G_1$ to $G_7$ and 1-line memories $M_1$ to $M_7$, another group being inputted to gates $G_{11}$ to $G_{17}$ and $G_{21}$ to $G_{27}$, and still another group being inputted to a data selector 207.

The color codes and density data thus latched by the latch 203 are controlled by memory selecting signals from the decoder 206.

The memory selecting signals from the decoder 206 select gates $G_1$ to $G_7$ sequentially every one line and a memory connected to the selected gate is made in writing state. Accordingly, each of the memories $M_1$ to $M_7$ is made in writing state by one line among seven lines and generates written data by other lines. Similarly, gates $G_{11}$ to $G_{17}$ are connected to color code input and output lines of the memories, so that gates are operated to be closed only when the memories are in writing state. The gates $G_{21}$ to $G_{27}$ are connected to density data input and output lines of the memories, so that gates are operated to be opened so as to generate density data of the picture element noted.

Accordingly, the signals outputted from these memories are color coded data (2 bits$\times 7=14$ bits), of which auxiliary scanning order is varied every line, and density data of the picture element noted corresponding thereto. Thus, the data selector 207 has such a role that the color coded data, of which auxiliary scanning order is varied every lines are rearranged by the output of the decoder 206.

The writing operations of the memories $M_1$ to $M_7$ are effected in the order of $M_1, M_2, \ldots M_6, M_7, M_1, \ldots$.

In case that the memory $M_1$ is in writing state while the document is reading, the memory $M_2$ is read by the address (13 bits) in which the signal before 6 lines from the line for writing in the memory $M_1$ is stored, the memory $M_3$ is read by the address in which the signal before 5 lines from the line for writing in the memory $M_1$ is stored and similarly the memory $M_4$ is read by the address storing the signal before 4 lines, the memory $M_5$ is read by the address storing the signal before 3 lines, the memory $M_6$ is read by the address storing the signal before 2 lines, and the memory $M_7$ is read by the address storing the signal before 1 line.

The density data of the picture element noted at this state is data stored in the memory $M_4$.

The color codes (of 14 bits) of the individual lines thus outputted from the data selector 207 are fed as individual addresses to a ghost removing ROM 208 in the auxiliary scanning direction so that the color ghosts of the noted pixel are corrected in the auxiliary scanning direction. As a result, the color codes thus outputted from the ghost removing ROM 208 have their color ghosts removed in both the main and auxiliary scanning directions. The color codes thus having been subjected to the color ghost corrections are once latched in a latch 209 together with the density data outputted from the gate $G_{21}$, until they are outputted.

On the other hand, color data and density data of 7 lines are stored in the 1-line memories $M_1$ to $M_7$ and are read out, if necessary, so that they are processed. Since a real image has a capacity of several hundreds lines, it cannot be processed by the line memories of the shown number. Therefore, the overlap operation is conducted to switch new density data from the last 1-line memory.

Figure 49:
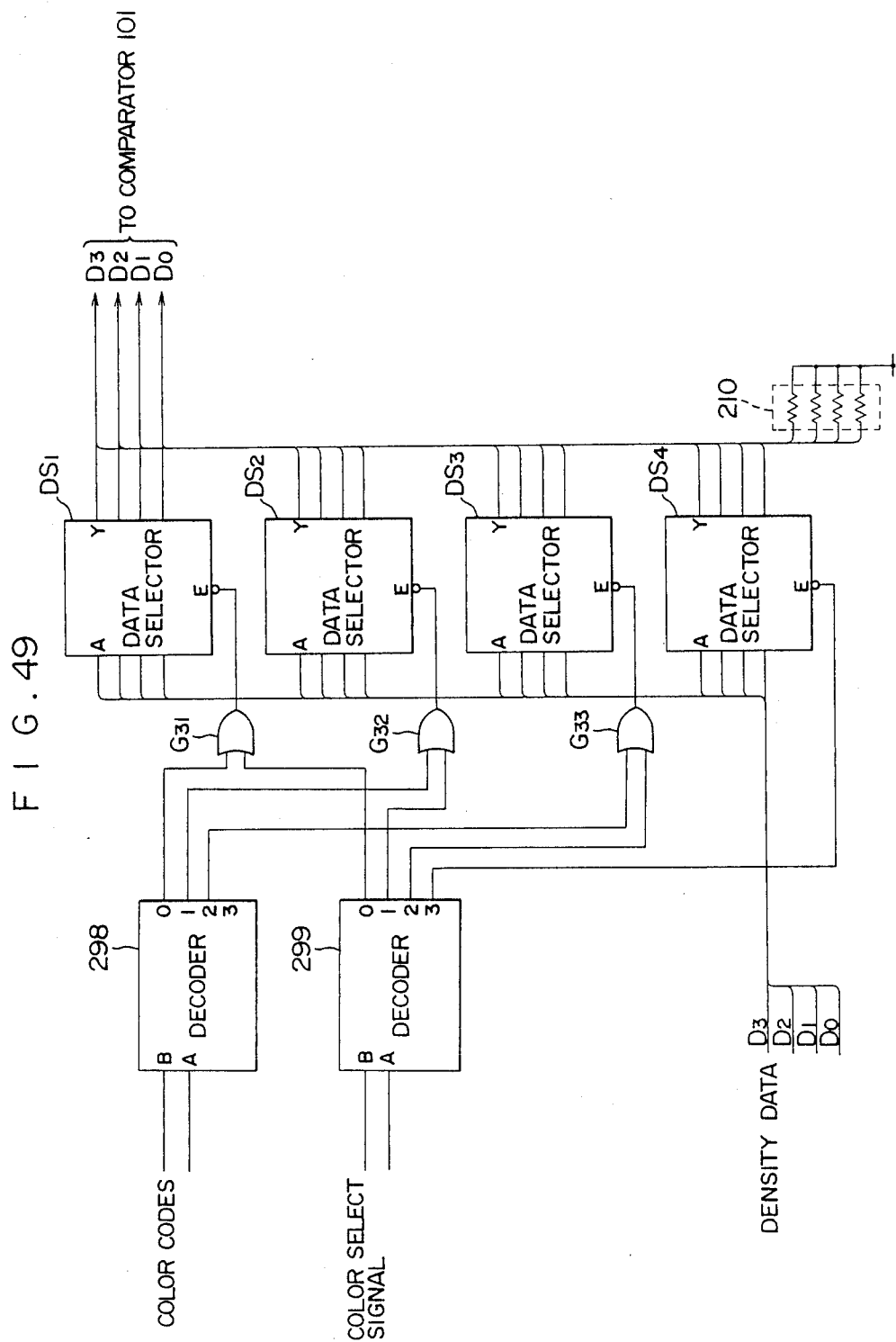
FIG. 49 presents a block diagram illustrating an example of the detailed structure of a density signal separating circuit.

FIG. 49 is a circuit diagram showing an example of the detailed structure of the density signal separator 301. Density data $D_0$ to $D_3$ outputted from the latch 209 (as shown in FIG. 48) are commonly inputted to data selectors $DS_1$ to $DS_4$ provided for the black, blue and red colors and the full-output. On the other hand, the color codes and the color select signals are decoded by the decoders 298 and 299. Here, the correspondences between the color codes and color select signals, and the colors are as follows:

| 0 | 0 | Black |
| 0 | 1 | Blue |
| 1 | 0 | Red |
| 1 | 1 | White |

(b) Color Select Signals:

| 0 | 0 | Black |
| 0 | 1 | Blue |
| 1 | 0 | Red |
| 1 | 1 | Full-Output. |

Of the decoded signals outputted from the decoders 298 and 299, the paired signals outputted from the common ouput terminals (e.g., the 0 outputs of the decoders 298 and 299) are fed to OR gates $G_{31}$ to $G_{33}$. And, the OR outputs of these OR gates $G_{31}$ to $G_{33}$ are fed as enable signals to the data selectors $DS_1$ to $DS_3$. However, the data selector $DS_4$ is connected directly with all the output terminals of the decoder 299. In the circuit thus constructed, when a color is designated in accordance with either the color codes or the color select signals from the outside, the corresponding color select signal of the decoder 298 or 299 is dropped to "0" to enable the predetermined data selector $DS_1$ to $DS_4$ through the OR gates $G_{31}$ to $G_{33}$ (however, the data selector $DS_4$ is enabled directly by the output of the decoder 299). The density data are outputted from the enabled data selector and are fed to the subsequent comparator 302 (as shown in FIG. 47). Incidentally, in case all the outputs of the data selectors $DS_1$ to $DS_4$ have high impedances, the output results are fixed at "0" (white) for the individual signal lines by a pull-down resistor 210. When the data selector is not enabled, output of the data selector has high impedance.

As has been described in detail hereinbefore, according to the outstanding embodiment of the present invention, the color extraction memories can be commonly accessed to so as to obtain color-extracted data in individual colors, when an image is to be picked up, by the density data of individual color ranges based on the color extraction map in the color extraction memories together with the color codes. Thus, it is possible to provide an image processing apparatus which is enabled to produce an image of high quality by ensuring the color ghost removal with a single scanning action of an original document.

FIG. 50 is a block diagram showing the structure of a further embodiment of the present invention. The same components as those of FIG. 24 are designated at the same reference numerals. The black memory 62, the red memory 63 and the blue memory 64 are stored with individual data which has its pixel information composed of the aforementioned color designating and density informations. The density informations and the color designating color codes are outputted from the color extraction memories 62 to 64 which are commonly addressed by the ($V_R + V_C$) memory 51 and the $V_C/(V_R + V_C)$ 52. Of these, the density informations are commonly inputted to the memory planes 84 to 86 of individual colors for storing the density data. On the other hand, the color codes are decoded by the decoder 87 so that the decoded outputs are inputted as memory select signals to the memory planes 84 to 86 of the individual colors.

The color codes are composed of two bits (which can discriminate four colors), for example. The black memory plane 84 is addressed for the code "00", the blue memory plane 86 is addressed for the code "01"; and the red memory plane 85 is addressed for the code "10". At this time, the counter 96 counts the shift clocks oi the CCDs 1 and 2 and accordingly the addresses of the pixels in the main and auxiliary scanning directions and feeds them to the memory planes 84 to 86 so that the density informations are stored in the address of the memory plane designated by the output of the decoder 87. Thus, according to the present invention, the multi-color image informations can be stored in the memory planes by the single image reading operation without repeating these actions of the number of the colors.

According to the apparatus of the present invention, the color ghosts can be removed by processing the color designating informations. As a result, the informations of plural colors can likewise be stored by the single image pickup action by conducting the color ghost removal after the color extraction and by subsequently using the circuit shown in FIG. 50. As an application of the present invention, moreover, a variety of image processings can be conducted for the density informations before the multiple valuation.

Figure 51:
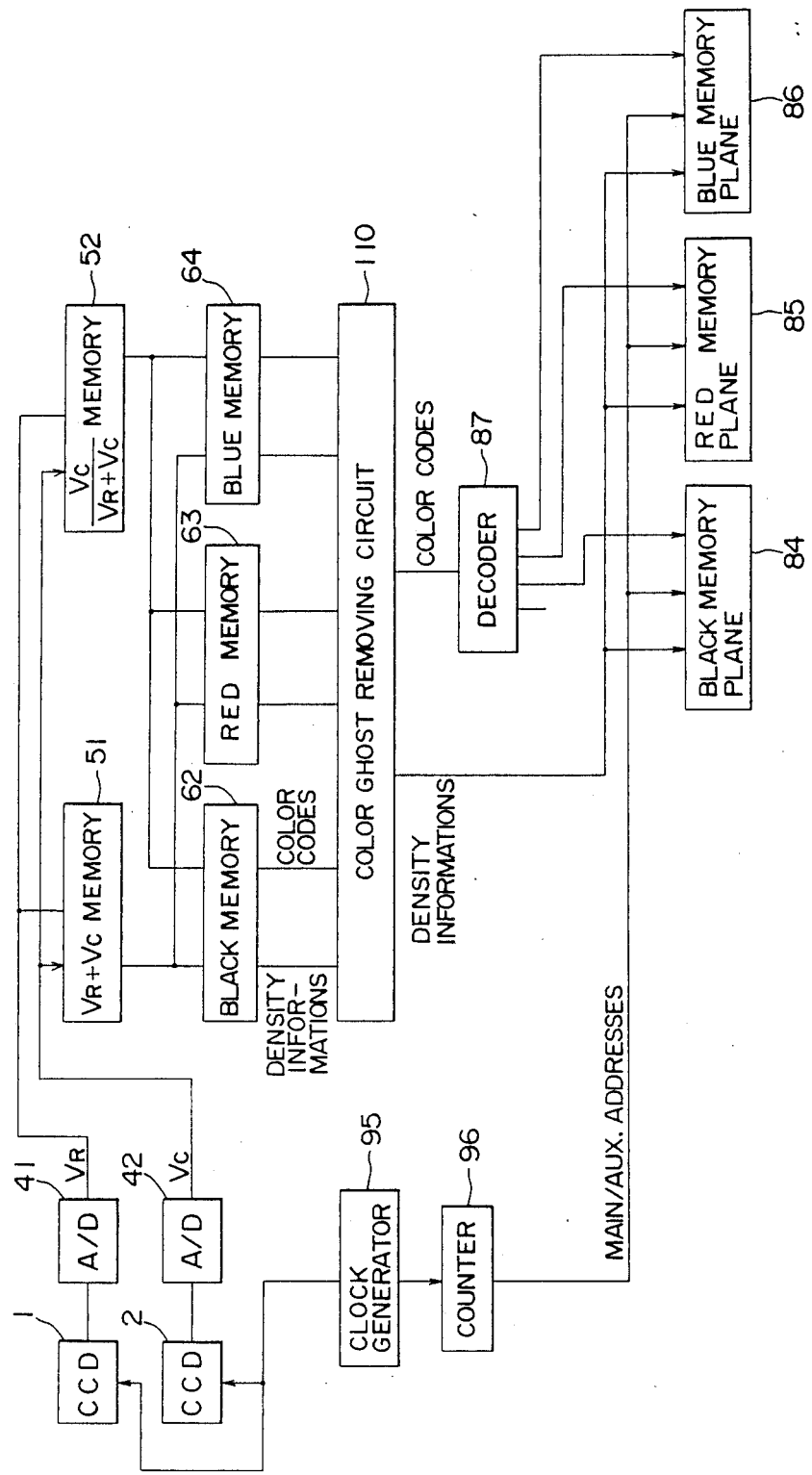
FIG. 51 presents a block diagram illustrating a further embodiment of the present invention.

FIG. 51 is a block diagram showing the structure according to a further embodiment of the present invention and an image processing apparatus including a color ghost processing circuit. The same components as those of FIG. 50 are designated at the same reference numerals. In FIG. 50, reference numeral 110 designates the color ghost removing circuit which has been described with reference to FIG. 29. The image informations of the individual colors stored in the color extraction memories 62 to 64 are read out and subjected to the color ghost removal. After this, the density informations are stored in the individual memory planes 84 to 86 which are selected by the decoder 87. Incidentally, the density informations can be subjected after the color extraction (or after the color ghost removal) to a variety of image processings (such as size change, image emphasis or gradation), and the color codes are then decoded so that both may be stored in the memory planes.

As has been described in detail hereinbefore, according to the outstanding embodiment of the present invention, the image informations are composed of the color designating informations and the density informations, and the storage address of the memories are designated in accordance with the color designating informations and the counted values of the positions of the individual pixels to store the corresponding density informations. Thus, the multi-color image information can be stored in the memories by the single image pickup action so that the image can be processed at a high speed.

What is claimed is:

1. An image processing apparatus in which first color image signals are generated by scanning an image of an original, separating the image into a plurality of color images and converting the optical information of the color images to first color image signals for each pixel of the image by scanning means, said apparatus comprising means for processing said first color image signals to generate a second color image signal which corresponds to each of the pixels, comprises a plurality of bits and carries density data and color data, said color data designating which one of a plurality of predetermined colors the color of the pixel belongs to, and image processing means for processing said second color image signal.

2. An image processing apparatus according to claim 1, wherein said image processing means comprises means for processing said color data.

3. An image processing apparatus according to claim 2, wherein said color data processing means is means for removing color ghost.

4. An image processing apparatus according to claim 3, wherein said color ghost is removed in accordance with a color pattern method.

5. An image processing apparatus according to claim 1, wherein said color data comprises a code designating white and at least one code designating other color than white.

6. An image processing apparatus according to claim 1, wherein said second color image signal comprises density data comprising a plurality of bits.

7. An image processing apparatus according to claim 6, wherein said image processing means comprises means for processing said density data.

8. An image processing apparatus according to claim 7, wherein said density data processing means comprises means for correcting MTF (Modulation Transfer Function).

9. An image processing apparatus according to claim 7, wherein said density data processing means comprises means for changing the gradient of an image to be reproduced.

10. An image processing apparatus according to claim 7, wherein said density data processing means comprises means for emphasizing at least a part of an image to be reproduced.

11. An image processing apparatus according to claim 1 further comprising means for processing said second color image signal to generate third color image signal which reproduce a multilevel image.

12. An image processing apparatus according to claim 11, wherein the multileveled image is an off image.

13. An image processing apparatus according to claim 1, wherein said predetermined colors includes black.

14. An image processing apparatus according to claim 1, wherein said predetermined colors are three colors including black.

15. An image processing apparatus according to claim 6 further comprising means for converting said density data into on-off data.

16. An image processing apparatus according to claim 15, wherein said converting means comprising a memory having a plurality of threshold values each of which corresponds to one of the predetermined colors and means for selecting one of the threshold values.

17. An image processing apparatus according to claim 6 further comprising means for converting said density data into multiple leveled data.

18. An image processing apparatus according to claim 17, wherein said converting means comprising a memory having plural sets of threshold values each set of which corresponds to one of the predetermined colors and means for selecting one of said sets.

19. An image processing apparatus according to claim 6, wherein said image processing means comprises at least one of first image processing means for processing said color data and second image processing means for processing said density data.

20. An image processing apparatus according to claim 19, wherein said first image processing means comprises means for removing color ghost.

21. An image processing apparatus according to claim 20, wherein said second image processing means processes said second color image signal which has been processed by said color ghost removing means.

22. An image processing apparatus according to claim 1 further comprising means for selecting signals which have color data designating one color of said predetermined colors.

23. A method of processing image signals of separated color images of an original comprising a first step of processing said image signals to generate a color image signal which corresponds to each of pixels of an image of the original, comprises a plurality of bits and has color data designating which one of a plurality of predetermined colors the color of the pixel belongs to and density data and a second step of processing said color image signal.

24. A method according to claim 23, wherein said second step comprises processing said color data.

25. A method according to claim 23, wherein said second step comprises processing said density data.

26. A method according to claim 23, wherein said second step comprises removing color ghost by processing said color data.

27. A method according to claim 26, wherein said second step comprises processing said color image signal which has been processed in the step of removing color ghost.

28. An image processing apparatus in which first color image signals are generated by scanning an image of an original, separating the image into a plurality of color images and converting the optical information of the color images to first color image signals for each pixel of the image by scanning means, said apparatus comprising means for processing said first color image signals to generate a second color image signal which corresponds to each of the pixels, comprises a plurality of bits and carries color data designating which one of a plurality of predetermined colors the color of the pixel belongs to and density data designating the density of the pixel and image processing means for processing said second color image signal, said image processing means comprising means for processing said density data to change the magnification of an image to be reproduced.

29. An image processing apparatus according to claim 6, wherein said image processing means comprises a memory for storing said color data and density data.

30. A color image processing apparatus comprising means for generating a color image signal which comprises a plurality of bits, at least one of said bits representing color and at least another of said bits representing density, and means for correcting color ghost by processing said color representing bit.

31. An image processing apparatus comprising means for generating an image signal comprising a plurality of bits, at least one of said bits representing color and at least another of said bit representing density and means for processing said image signal.

32. An image processing apparatus according to claim 31, said processing means comprising at least one first means for processing said color representing bit and second means for processing said density representing bit.

33. An image processing apparatus according to claim 32, wherein the processing by said first processing means is followed by the processing by said second processing means.

34. An image processing apparatus according to claim 32, wherein the processings by said first processing means and by said second processing means are conducted in parallel.

35. An image reproduction apparatus comprising means for reading an image of an original to generate a first color image signals signal processing means for processing said first color image signal to generate a second color image signal which comprises a plurality of bits, at least one of said bit representing color and at least another oi said bits representing density, image processing means for processing second color image signal to generate a third image signal and means for reproducing an image based on said third image signal.

36. An image processing apparatus comprising means for generating an image signal which comprises a plurality oi bits, memory means ior storing said image signal, means for reading at least one high order bit of said image signal and processing said high order bit and means for reading at least one low order bit of said image signal and processing said low order bit.

37. An image reproduction apparatus according to claim 35, further comprising control means for controlling said image reproducing means.

38. An image reproduction apparatus according to claim 37, wherein said control means controls said image reproducing means so that said image reproducing means reproduces an image with a plurality of colors, at one image reading by said image reading means.

39. An image reproduction apparatus according to claim 37, wherein said control means controls said image reproducing means in such a manner that said control means transmits sets of said third image signals sequentially for each of the sets to said image reproducing means, said each set of said third image signal corresponding to one of plural colors and said image reproducing means reproduces plural color images sequentially for each of the plural colors.

40. An image processing apparatus according to claim 31, further comprising means for conducting color change by processing said color representing bit.

41. An image reproduction apparatus according to claim 37, wherein said control means conducts color change by processing said third image signal.

42. An image reproduction apparatus according to claim 37, wherein said image reproducing means comprises a plurality of developing units which contain toners different in color to each other, said control means controls said developing units so that said developing units operate in a first order, and output means comprising gate means for outputting said third image signal in a second order in color.

43. An image reproducing apparatus according to claim 42, wherein said gate means outputs said third image signal in said second order based on a signal from said control means so that said both orders are same with respect to color.

44. An image reproducing apparatus according to claim 42, wherein said gate means outputs said third image signal in said second order based on a signal from said control means so that said second- order is different from said first order with respect to color.

45. An image processing apparatus according to claim 21, wherein the processing of said second color image signal by said second image processing means is a modification of density data in said second color image signal to zero.

* * * * *